United States Patent
Candea et al.

(10) Patent No.: US 9,684,554 B2
(45) Date of Patent: Jun. 20, 2017

(54) SYSTEM AND METHOD FOR USING FAILURE CASTING TO MANAGE FAILURES IN A COMPUTED SYSTEM

(71) Applicant: Teradata US, Inc., Dayton, OH (US)

(72) Inventors: George Candea, Los Altos, CA (US); Mayank Bawa, Sunnyvale, CA (US); Anastasios Argyros, San Carlos, CA (US)

(73) Assignee: Teradata US, Inc., Dayton, OH (US)

( * ) Notice: Subject to any disclaimer, the term of this patent is extended or adjusted under 35 U.S.C. 154(b) by 79 days.

(21) Appl. No.: 13/739,251

(22) Filed: Jan. 11, 2013

(65) Prior Publication Data

US 2014/0201565 A1  Jul. 17, 2014
US 2017/0132096 A9  May 11, 2017

Related U.S. Application Data

(63) Continuation of application No. 11/692,113, filed on Mar. 27, 2007, now Pat. No. 8,359,495.

(51) Int. Cl.
| | |
|---|---|
| G06F 11/00 | (2006.01) |
| G06F 11/07 | (2006.01) |
| G06F 11/20 | (2006.01) |
| G06F 11/22 | (2006.01) |
| G06F 11/14 | (2006.01) |

(52) U.S. Cl.
CPC ........ *G06F 11/079* (2013.01); *G06F 11/0727* (2013.01); *G06F 11/2069* (2013.01); *G06F 11/2284* (2013.01); *G06F 11/1417* (2013.01)

(58) Field of Classification Search
CPC ............. G06F 11/1417; G06F 11/2069; G06F 11/2284
See application file for complete search history.

(56) References Cited

U.S. PATENT DOCUMENTS 8,515,727 B2 *  8/2013  Adams et al. .................. 703/22
2008/0244585 A1 * 10/2008  Candea et al. ............... 718/102

\* cited by examiner

*Primary Examiner* — Charles Ehne
(74) *Attorney, Agent, or Firm* — Ramin Mahboubian

(57) ABSTRACT

A system and method for using failure casting to manage failures in computer system. In accordance with an embodiment, the system uses a failure casting hierarchy to cast failures of one type into failures of another type. In doing this, the system allows incidents, problems, or failures to be cast into a (typically smaller) set of failures, which the system knows how to handle. In accordance with a particular embodiment, failures can be cast into a category that is considered reboot-curable. If a failure is reboot-curable then rebooting the system will likely cure the problem. Examples include hardware failures, and reboot-specific methods that can be applied to disk failures and to failures within clusters of databases. The system can even be used to handle failures that were hitherto unforeseen—failures can be cast into known failures based on the failure symptoms, rather than any underlying cause.

9 Claims, 12 Drawing Sheets

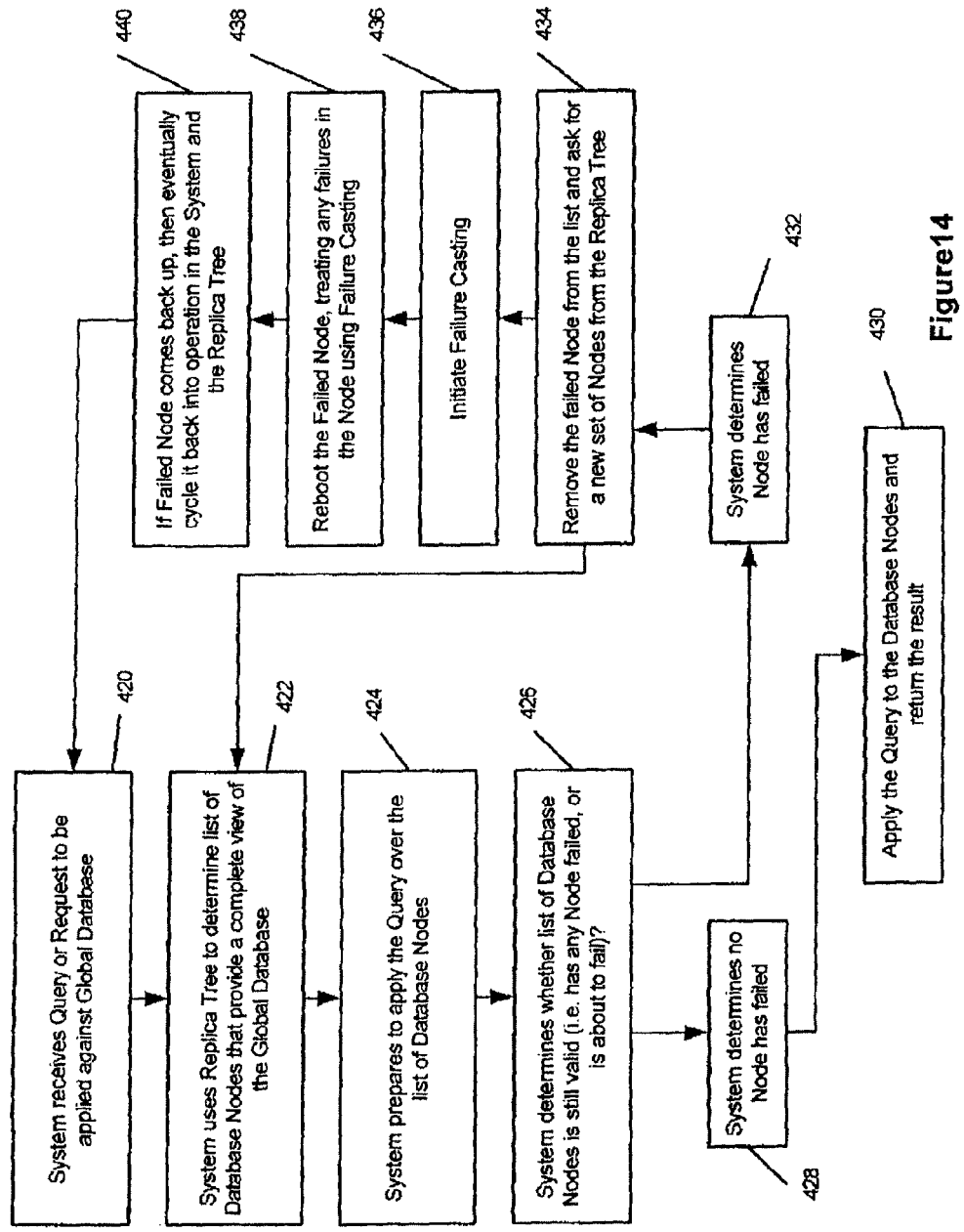

SYSTEM AND METHOD FOR USING FAILURE CASTING TO MANAGE FAILURES IN A COMPUTED SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

This application is a continuation of the U.S. patent application Ser. No. 11/692,113, entitled: "SYSTEM AND METHOD FOR USING FAILURECASTING TO MANAGE FAILURES IN COMPUTER SYSTEMS," filed on Mar. 27, 2007, which is hereby incorporated by reference herein in its entirety and for all purposes.

FIELD OF THE INVENTION

The invention relates generally to failure management in computer systems, and particularly to a system and method for managing failures in computer systems using failure casting.

BACKGROUND

Computer systems have become increasingly complex, and the applications to which computers are applied have become more varied and widespread. While once confined to commercial organizations, manufacturing companies, and financial institutions, computer systems are now found in most small businesses and households. Indeed in the United States it is not uncommon for a household to have many computer systems and other computational devices. Companies are now as likely to use their computers to communicate with other business entities as they are to use computers within their own organization. Business-to-Business (B2B) and Business-to-Consumer (B2C) applications are commonplace, and the latest enterprise-level systems are designed to serve any number from millions, to hundreds of millions, of potential users.

The more complex a computer application is, the more likely it needs to generate, utilize, and share huge amounts of data. The net result is that computer hardware, software, and data storage offerings have grown to keep pace with technological needs. Today, a sophisticated enterprise-level computer system may include hundreds of processors, operating upon a variety of operating systems and application servers, with many network links to the outside world, and a considerable amount of fault-tolerant (for example, Redundant Array of Inexpensive Disk, or RAID-based) disk storage.

However, while the increased use and complexity of computer systems has provided great benefits, these are not immune to challenges. Foremost among these challenges is the fact that computer systems, even the most expensive and well-designed enterprise-class systems, can sometimes fail. These failures may be hardware-based, such as the failure of a disk drive or a computer memory chip. Failures can also be software-based; for example a software application that exhibits bugs and ends up hanging due to running out of memory. Another example may be that of an entire computer crashing due to a buggy device driver that mismanaged its in-memory data structures. In many instances, failures arise from a combination of both hardware and software problems. A Gartner survey estimated that software failures cause approximately 40% of outages in large-scale, well-managed commercial systems for high-end transaction processing servers, and for systems in general. When software-induced failures and outages do occur, their effects are compounded by the fact that a large percentage of the software bugs that manifest themselves in production systems have no known available fix at their time of failure. According to one source (Wood: "Predicting Client/Server Availability", IEEE Computer, 28(4):41-48, 1995), this percentage of unknown-remedy bugs may account for as much as 80% of all software failures.

Given sufficient time, a software application can indeed mature and become more reliable, and less-failure-prone. This is how, for example, the U.S. public switched telephone network is able to provide its legendary high availability. It is estimated that only 14% of switched telephone network outages between 1992-1994 were caused by software failures; the third most-common cause after both human error (49%) and hardware failures (19%). (Kuhn: Sources of failure in the public switched telephone network. IEEE Computer, 30(4):31-36, April 1997). These statistics might suggest that a thorough design review and extensive testing could single-handedly improve the dependability of software systems. However, this is rarely the case; and indeed there appears to be a significant limitation to how truly free a software program can be of all bugs. Researchers and engineers have improved programming languages, built powerful development and testing tools, designed metrics for estimating and predicting bug content, and assembled careful development and quality assurance processes. In spite of all these developments, many deployed software applications are still far from perfect. It is estimated that two-thirds of software bugs that manifest in deployed systems could not have been readily caught by better testing processes (according to a U.S. National Institute of Standards survey).

SUMMARY

Disclosed herein is a system and method for managing failures in a computer system using failure casting. In accordance with an embodiment, the system comprises a system manager and a failure casting logic that uses a failure casting hierarchy to cast failures of one type into failures of another type. In doing this, the system allows a multitude of incidents, problems, or failures with potentially unknown resolutions to be cast into a small set of failures, which the system knows how to recover from. In accordance with a particular embodiment, failures can be cast from a category of failure that is considered non-reboot-curable into a category of failure that is considered reboot-curable (or simply "curable). If a failure is reboot- or restart-curable then rebooting/restarting the system or a part thereof will cure the problem; by casting the failure, a failure previously unrecoverable via reboot can now be resolved by rebooting. In some embodiments, the range of failures can be arranged in a hierarchy of parent and child failure scenarios. Failure casting then locates the failure in the hierarchy, and allows a system manager to determine the appropriate action to be taken. When the failure hierarchy and the failure logic is incorporated into a bootup script or an initialization script, for example when used with a disk array, network cluster, or other component, then the system allows for the failure casting to take place at boot time, thus making a system reboot be an easy-to-use cure for many failures.

It will also be apparent from the description provided herein that the system can even be used to handle failures that were hitherto unforeseen (indeed it is impossible in a complex system to foresee every possible type of failure or error). Using embodiments of the present invention, unforeseeable or unknown failures can be cast into foreseeable or known failures based on the failure symptoms, rather than any underlying cause. The failure can then be dealt with appropriately as a known type of failure. When this technique is applied to the particular embodiment of reboot-curable failure casting, then the system can attempt to cure the failure by rebooting or some other action. Thus, failures can be handled for which no specialized recovery could have been written in the first place, since they were unforeseen.

Traditional recovery code techniques deal with exceptional situations, and are designed to run flawlessly. Unfortunately, exceptional situations are difficult to handle and are difficult to simulate during development. This often leads to unreliable recovery code. However, in systems that cast failures into reboots or restarts, the recovery code is exercised every time the system starts up, which ultimately improves the reliability of this code through implicit testing during every start-up.

Other embodiments, improvements, and uses of the failure casting technique will be evident from the description provided herein.

BRIEF DESCRIPTION OF THE FIGURES

FIG. 14 illustrates a flowchart of a method for applying failure casting techniques to a cluster.

DETAILED DESCRIPTION

Figure 1:
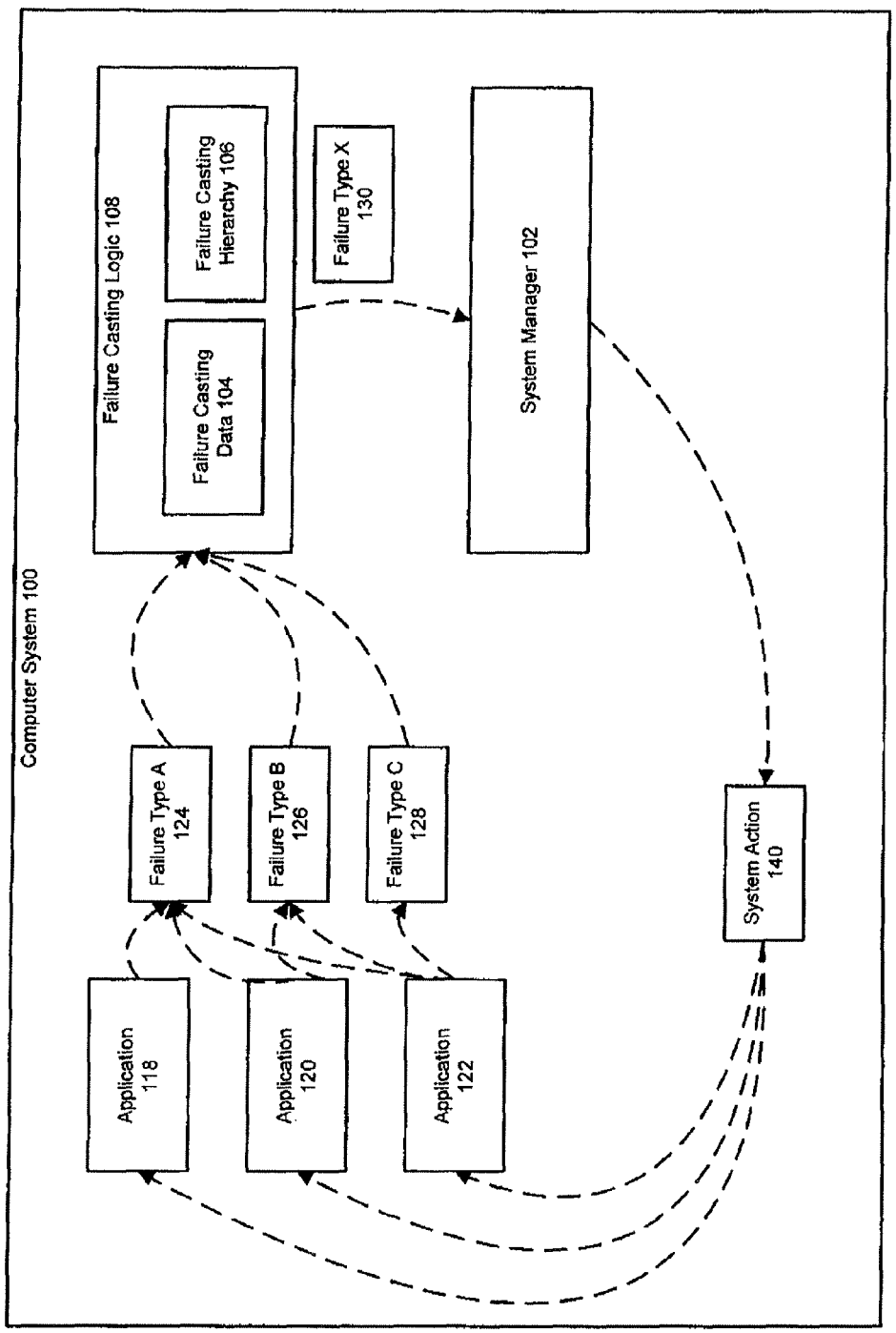
FIG. 1 shows an embodiment of a computer system that uses failure casting in accordance with an embodiment of the invention.

Two phenomena conspire to limit the effectiveness of traditional approaches to failure management in software environments: code evolution, and unforeseen usage scenarios. Both of these factors prevent software developers from being able to guarantee a program of reasonable size will run as expected once it is deployed at the customer's site.

With regard to code evolution, in the software industry change is the enemy of dependability, or said differently "if it ain't broke, then don't fix it". Only in a software system that evolves very slowly is it possible to control the effects of change, and to maintain or improve software quality. For example, the software running on NASA's space shuttle software requires approximately half a million lines of software code. However, as of 1997, its last three releases manifested only one bug each, with the last 11 versions totaling only 17 bugs. (Fishman: "They Write the Right Stuff", FastCompany, 1997). Such reliability comes at the expense of evolution: upgrading the shuttle software to use GPS-based, instead of land-based, navigation was a major undertaking; the change involved only 1.5% of the code, yet simply formalizing the required specifications took months, followed by an even longer development and test cycle. While this rigidity ensures a more reliable final set of code, it would threaten the existence of most software systems in use today and in the near future, mainly because of customer demands and time-to-market pressures. This is true of the entire software stack in operating systems, applications, and software services; and is also true for both commercial and open-source environments.

With regard to unforeseen usage, the presence of increasingly diverse execution environments and different scenarios constitute another factor that limits software quality. Returning to the example of the space shuttle program mentioned above, the NASA software development organization has the advantage of supporting only one platform and only one customer. In contrast, most of today's commercial software applications must interact with a variety of devices, support a variety of configurations and uses, and be combinable with other third-party software. Even if a system's code base did not change, a new execution environment or scenario might unavoidably exercise a code path that had never been tested, manifesting heretofore latent or unknown bugs. Furthermore, even if the testing of all paths through a program was possible, the testing of all imaginable execution environments and their ensuing interactions would not. The more complex a software product, the more difficult it is to understand and predict its behavior in production. For example, a complex database server product may be subjected to an extensive battery of tests, yet still not pass all of those tests prior to release, because those bugs that are still present in the final product are dependent on the tester's environment, making them difficult to reproduce, or too expensive and/or risky to fix. This is largely true of all commercially-produced software.

To address the above challenges, today's software companies and organizations expend substantial resources to help prevent, detect, and when necessary quickly resolve failures in their computer systems. Typically these resources require greater administrative overhead in terms of manpower and expenditure. Furthermore, notwithstanding the benefits of these tools, the managing of failures in computer systems is still a complex task, since many parts of the system or the software can fail, and there are many interdependencies, which makes recovery complicated. For example, in a transaction processing system that includes a plurality of nodes, and wherein those nodes operate according to a two-phase commit protocol, the failure of one node can require a number of additional, otherwise operable, nodes to abort their transactions.

Notwithstanding the availability of these administrative tools, a commonly-used and longstanding approach to resolving a system failure is to reboot or restart the offending application, server, system, machine, or component. Rebooting is a simple, practical and effective approach to managing failure in large, complex systems; it is an approach that accepts bugs in applications as facts to be coped with, instead of viewing them as problems that must be eliminated at all costs. The results of several studies, (including, for example, Sullivan and Chillarege: "Software Defects and Their Impact on System Availability: A Study of Failures in Operating Systems", In Proc. 21st International Symposium on Fault-Tolerant Computing, Montréal, Canada, 1991; Gray: "Why Do Computers Stop and What Can Be Done About It?", In Proc. 5th Symp. On Reliability in Distributed Software and Database Systems, Los Angeles, Calif., 1986; Murphy and Gent: "Measuring System and Software Reliability Using an Automated Data Collection Process", Quality and Reliability Engineering Intl., 11:341-353, 1995; and Chou: "Beyond Fault Tolerance", IEEE Computer, 30(4): 47-49, 1997), combined with experience in the field (for example, Brewer: "Lessons From Giant-Scale Services", IEEE Internet Computing, 5(4):46-55, 2001), suggest that many failures can be successfully recovered by rebooting. Not surprisingly, today's state-of-the-art Internet clusters provide facilities to circumvent a faulty node by failing-over, rebooting the failed node, and then subsequently reintegrating the recovered node into the cluster.

Rebooting provides a number of advantages. First, rebooting scrubs any volatile state that has potentially become corrupt, for example a bad pointer, a deadlock involving a set of multiple exclusion objects (mutexes), or an accumulated computation error. Rebooting also reclaims leaked resources and does so decisively and quickly, because mechanisms used to effect the reboot are simple and low-level: for example virtual memory hardware, operating system processes, and language-enforced mechanisms. Should an application leak memory, this memory will be reclaimed upon restarting that application process.

Second, rebooting returns an application program to its start state (or at least to a well-known state), which is the best understood and most thoroughly debugged state of the program. Whenever a program starts up, it begins in its start state, so this is the most frequently visited state during development, testing, and operation.

Third, rebooting improves overall uptime by saving on actual diagnosis time. When failure strikes in a critical computer system, operators cannot always afford to run real-time diagnosis; instead, they focus on bringing the system back up quickly, by any means possible, and then perform any necessary diagnosis later. Experienced operators realize that there is a large opportunity-cost in taking an hour or more to decide whether a reboot would or would not cure the failure, whereas a minute-long reboot would answer that question much sooner. Rebooting is a simple task to undertake, regardless of whether it is performed by an administrator or a machine, so implementing and automating a recovery policy based on rebooting is one of the easiest and simplest of all recovery alternatives. Rebooting is also a universal form of recovery, since a failure's root cause does not need to be known in order to recover it by reboot. The fact that rebooting can be done "blindly" is indeed one of the very reasons some practitioners frown upon its liberal use. Nevertheless, as software becomes more complex and availability requirements more stringent, the willingness and ability to perform a thorough diagnosis prior to recovery may make reboots a more tempting option.

However, as used in today's computer systems, the decision to reboot an application, server, component or system is at best a hopeful attempt at resolving the immediate symptoms of the failure. The traditional concept of rebooting does not attempt to rectify or isolate the underlying failure. In short, today's systems are not designed to be recovered by reboot. The net result is that the underlying failure often persists even after the reboot. Rebooting has two other principal drawbacks: loss of data and unpredictable recovery times. While scrubbing corrupt data is beneficial, losing good data is obviously not. For example, in a traditional, buffered UNIX filesystem, updates are kept in a volatile buffer cache for up to 30 seconds. Should an unexpected crash occur during that period, any data that had been written to the buffer cache, but not to the disk, would be lost. This problem has been recognized in today's Internet services, which is why most Internet-based systems now maintain all important data (including session state, such as a user's shopping cart) in databases. Another drawback of rebooting is that it can result in long and unpredictable recovery times. Data recovery procedures in systems handling large amounts of data can last many hours (for example, when the system is forced to perform filesystem and transaction log checks after restarting). Modern systems recognize this problem by, for example, allowing administrators to tune the rate of checkpointing, such that recovery time after a crash does not exceed a configured upper limit, (an example of which is described in Lahiri, et al: "Fast-Start: Quick Fault Recovery in Oracle", In Proc. ACM International Conference on Management of Data, Santa Barbara, Calif., 2001). In the worst case, if there is a persistent fault (for example, a failed disk or a misconfiguration), the system may never come back up and instead require some other form of recovery.

An alternative, commonly-used approach to handling failures is to use customized recovery code to identify and correct problems in the system. Recovery code deals with exceptional situations, and must run flawlessly. Unfortunately, exceptional situations are difficult to handle and are difficult to simulate during development. This often leads to unreliable recovery code. The problem is particularly relevant given that the rate at which the number of bugs are reduced per thousand-lines of code has fallen behind the rate at which the number of lines of code per system increases, with the net result being that the number of bugs in an evolving system generally increases over time. More bugs mean more failures, and systems that fail more often need to recover more often. Poorly tested recovery code makes these systems fragile. Furthermore, as a computer system evolves, failure modes change (for example, a temporary network outage may cause an older kernel to terminate all network connections, but an upgraded kernel may instead cause remote filesystems to be corrupted). Additionally, what constitutes the "right recovery" to a certain type of failure may also change over time (for example, a failure on a database server may expect a transaction abort as sufficient recovery, but new interdependencies may also require a failure to be accompanied by the restart of any corresponding application servers).

Within the field of data storage/retrieval environment, some steps toward software redundancy, failure management, and recovery code were made with the introduction of database transactions in the 1980s, (as described, for example, in Gray and Reuter: "Transaction processing: concepts and techniques"; Morgan Kaufmann, San Francisco, 1993). Transaction-related techniques, in conjunction with the ACID semantics of databases (Atomicity, Consistency, Isolation, and Durability), enabled applications to abstract the various reasons for which an operation may fail, and to use only three primitives to ensure proper updating of a database: begin_transaction, commit_transaction, and abort_transaction. Other systems, (for example, those disclosed in Nagaraja, et al. "Using Fault Model Enforcement to Improve Availability"; In Proc. 2nd Workshop on Evaluating and Architecting System Dependability, San Jose, 2002), can be used to force all unknown faults into hardware node crashes. This can then be used to improve the availability of a clustered web server.

Many techniques have also been advocated for improving software dependability, ranging from better software engineering (for example, as described in Brooks: "The Mythical Man-Month", Addison-Wesley, Reading, Mass., 1995), and object oriented programming languages (for example, as described in Dahl and Nygaard: "Simula—an Algol-Based Simulation Language", Communications of the ACM, 9(9): 671-678, September 1966), to formal methods that predict/verify properties based on a mathematical model of the system (for example, Schulmeyer and MacKenzie: "Verification and Validation of Modern Software-Intensive Systems", Prentice Hall, Englewood Cliffs, N.J., 2000). Language-based methods, such as static analysis (described, for example, in Patrick Cousot, editor: "Static Analysis", Springer Verlag, 2001), detect problems at the source-code level. Some programming languages prevent many programming errors by imposing restrictions, such as type safety (Niklaus: "The Programming Language Oberon", Software—Practice and Experience, 18(7):671-690, 1988), or a constrained flow of control (Mogul: et al: "The Packet Filter: An Efficient Mechanism for User-Level Network Code", In Proc. 11th ACM Symposium on Operating Systems Principles, Austin, Tex., 1987), or by providing facilities like garbage collection (McCarthy: "Recursive Functions of Symbolic Expressions and Their Computation by Machine", In Artificial Intelligence. Quarterly Progress Report No. 53. MIT Research Lab of Electronics, Cambridge, Mass., 1959).

Rapid detection is a critical ingredient of fast recovery. A large fraction of recovery time, and therefore availability, is the time required to detect failures and localize them well enough to determine a recovery action (described for example in Chen et al: "Path-Based Failure and Evolution Management", In Proc. 1st Symposium on Networked Systems Design and Implementation, San Francisco, Calif., 2004). A recent study, (Oppenheimer et al: "Why do Internet Services Fail, and What Can be Done About It?", In Proc. 4th USENIX Symposium on Internet Technologies and Systems, Seattle, Wash., 2003) found that earlier detection might have mitigated or avoided 65% of reported user-visible failures.

Checkpointing, (described for example in Wang, et al: "Checkpointing and its Applications", In Proc. 25th International Symposium on Fault-Tolerant Computing, 1995; Chandy and Ramamoorthy: "Rollback and Recovery Strategies for Computer Programs", IEEE Transactions on Computers, 21(6):546-556, June 1972; and Tuthill et al: "IRIX Checkpoint and Restart Operation Guide", Silicon Graphics, Inc., Mountain View, Calif., 1999), employs dynamic data redundancy to create a believed-good snapshot of a program's state and, in case of failure, return the program to that believed-good state. An important challenge in checkpoint-based recovery is ensuring that the checkpoint is taken before the state has actually been corrupted (described for example in Whisnant, et al: "Experimental Evaluation of the REE SIFT Environment for Spaceborne Applications", In Proc. International Conference on Dependable Systems and Networks, Washington, D.C., 2002). Another challenge is deciding whether to checkpoint transparently, in which case recovery rarely succeeds for generic applications (described for example in Lowell et al: "Exploring Failure Transparency and the Limits of Generic Recovery", In Proc. 4th Symposium on Operating Systems Design and Implementation, San Diego, Calif., 2000), or non-transparently, in which case source code modifications are required. In spite of these problems, checkpointing is a useful technique for making applications restartable, and is sometimes used with a watchdog daemon process to provide fault tolerance for long-running UNIX programs.

Additional techniques to minimize, detect, and recover from failures have been investigated. However, each of the above systems, while beneficial to some extent, generally assume unrealistic fault models (for example, they may assume that failures occur according to well-behaved, tractable probability distributions). If it is possible to state invariants about a system's failure behavior, and make such behavior more predictable, then the larger range of failures can be coerced into a smaller universe of failures which in turn is governed by well-understood rules. This is the area that the present invention is designed to address.

Introduction to Failure Casting

Disclosed herein is a system and method for managing failures in a computer system using failure casting. In accordance with an embodiment, the system comprises a system manager and a failure casting logic that uses a failure casting hierarchy to cast failures of one type into failures of another type. In doing this, the system allows a large set of incidents, problems, or failures to be cast into a small set of failures, which the system knows how to handle. In accordance with a particular embodiment, failures can be cast from a category of failure that is considered non-reboot-curable into a category of failure that is considered reboot-curable (or simply "curable"). If a failure is reboot-curable then rebooting the system will cure the problem. In some embodiments, the range of failures can be arranged in a hierarchy of parent and child failure scenarios. Failure casting then places the failure into the hierarchy, and allows a system manager to determine the appropriate action to be taken. When the failure hierarchy and the failure logic is incorporated into a bootup script or an initialization script, for example when used with a disk array, network cluster, or other component, then the system allows for the failure casting to take place at boot time. As each component in a system is made reboot-curable, then a wide variety of system failures can be handled simply by rebooting the system. Specific casting techniques are described herein for use with different hardware or software components, for example for disk failures, out-of-memory situations, and even higher-level software bugs. Examples provided herein also include hardware, and reboot-specific methods that can be applied to disk failures and to failures within clusters of databases.

It will also be apparent from the description provided herein that the system can even be used to handle failures that were hitherto unforeseen (indeed it is impossible in a complex system to foresee every possible type of failure or error). Using embodiments of the present invention, unforeseeable or unknown failures can be cast into foreseeable or known failures based on the failure symptoms, rather than any underlying cause. The failure can then be dealt with appropriately as a known type of failure. When this technique is applied to the particular embodiment of reboot-curable failure casting, then the system can attempt to cure the failure by rebooting or some other action.

Traditional recovery code techniques deal with exceptional situations, and are expected to run flawlessly. Unfortunately, exceptional situations are difficult to handle, occur seldom, and are difficult to simulate during development. This often leads to unreliable recovery code. However, in accordance with an embodiment, failure casting can be performed at start time or boot up; thus, when a system employs failure casting to cast failures into reboots or restarts, then the recovery code is exercised every time the system starts up, which ultimately improves system reliability.

In accordance with various embodiments, the system can use an analogy to type conversion (or type casting) to treat the symptoms of one failure as if they were the symptoms of a more general class of failure; or to change the characteristics of a first failure to the characteristics of a second failure. Failure casting can then connect failure symptoms to the way the recovery code is written, rather than connecting pre-programmed recovery code to what might go wrong. This is one of the distinguishing aspects of failure casting over traditional recovery techniques.

The concept of type conversion or type casting is familiar to computer programmers, and is often used to take advantage of certain types of hierarchy. In some computer programming languages it is common to convert values of one type into values of another type in order to manipulate the corresponding variable alternately as a variable of the first type or the second type. For example, converting an integer from a little-endian to a big-endian representation in the C language can use typecasting to treat that integer as an array of bytes that can be individually manipulated (instead of as an integer, which cannot be modified at the byte level), as shown in listing 1:

| Listing 1 |
|---|
| unsigned char aux; |
| unsigned char[4] var;                // 'var' is an array |
|                                      // of bytes |
| (int) var = 123456;                  // cast 'var' into an integer, |
|                                      // and then assign a |
|                                      // little-endian integer to it |
| // swap 1st and 4th byte |
| aux = var[0];                        // 'var' is now used as an |
|                                      // array, not an integer |
| var[0] = var[3]; |
| var[3] = aux; |
| // swap 2nd and 3rd byte |
| aux = var[1];                        // 'var' is now used as an |
|                                      // array, not an integer |
| var[1] = var[2]; |
| var[2] = aux; |
| // print out the big-endian version of the integer |
| printf( "%u", (int) var );           // 'var' is now used as an |
|                                      // integer, not an array |

In accordance with an embodiment, the system applies analogous casting techniques to failures (instead of variables). As described herein, in failure casting a multitude of failures can be viewed as being instantiations of a higher-level type of failure. The combination of all of the various failure types thus comprise a failure hierarchy. Using the different levels of the failure hierarchy, a child failure type can be cast into a parent failure type. The developer need then only write recovery code for the parent failure type. In the same manner as the above example in which 'var' (initially declared as an array of bytes) could be treated as an integer, by virtue of typecasting, failure casting allows failures of one (potentially unknown) type to be treated (for the purpose of recovery) as failures of a different type.

One of the benefits of failure casting is its ability to handle unknown problems. For example, in a particular system a first failure type A may be well understood by the system's designers, and may have well-tested recovery code in place, whereas a second failure type B may be completely unforeseen or unanticipated by the system designers, and thus there is no known way for the system to handle it. When failure casting is used, the latter (and hitherto unknown) failure type B can be cast into the former failure type A and can be handled appropriately using A's recovery code, as long as B is in some manner compatible with A.

Failure casting also minimizes runtime overhead. For example, even if the latter failure type B could have been foreseen by the system designers, due to systemic interactions it may be much more efficient at runtime to resolve the A type of failure than to try to resolve a B type failure in isolation. In a high availability system it is of paramount importance that the system be kept running, that recovery be as fast as possible, and that data losses be minimized. This can occasionally mean applying a larger-scope recovery when a finer-grain recovery might actually be the better choice in some sense; but have a lower chance of success. For example, when failure casting is applied to reboot-curable failures, then this might mean choosing to reboot the system to cure a particular failure type, even though that failure type could possibly have been cured by means other than a reboot. Although the reboot seems quite drastic, it can have a greater chance of overall success.

An additional benefit of failure casting is reduction of system or software development time. It may be quicker to design and write a recovery procedure for type A failures, and then cast as many failures (including failure type B) into that failure type where they can be handled using A-type routines, rather than design and write recovery procedures for each of the individual failure types. For the software developer this improves their product's time-to-market, because it reduces overall development time and testing time.

Failure casting also enables a form of runtime diagnosis, which has heretofore not been possible using traditional techniques. By casting failure type B into type A, the system can "explore" the possibility that a failure type B might be cured by A's recovery procedure. If it does resolve the problems, then the error has been handled very efficiently. If it does not resolve the problems, then at least the system now knows more about failure type B than it did before, namely that it cannot be cured by A's recovery routines (i.e., that type B is incompatible with type A). The system now has the option of trying other types of recovery (for example, casting failure type B into another type C), or can resort to a recursive expansion of recovery scope, as described in further detail below. The net effect of this exploration is that over time the system can learn more about different failure types, and different ways to handle those failure types. The system can also record this information for future use and for better runtime diagnosis.

Since the recovery procedure for a failure type A may be more predictable than that for failure type B (for example, because the system knows exactly how long an A recovery will take, or because the system knows that an A-type failure recovery will not affect some other process that is running at the same time that could lead to race conditions), failure casting can make the whole recovery process more predictable.

Casting Failures into Reboot-Curable Failures

Depending on the particular embodiment used, failure casting can be performed in reaction to observed symptoms (i.e., the system notices symptoms of a failure of type B, and explicitly decides to treat or cast that failure as being of type A). Alternatively, the failure casting can be performed at recovery time (i.e., applying type A's recovery routines at recovery time to treat failure type B which implies a casting of one failure type into another). These two scenarios would be one-and-the-same if there weren't really two separate steps in a typical recovery process: (a) the action performed by the system administrator, for example the making of an affirmative decision to reboot a node; and (b) the action performed by the system or component to reinstate itself into an operational state, for example, by allowing the system to scan the SCSI bus and to de-configure any disks it determines are bad.

Both of these actions are part of the typical system recovery process. However, in accordance with a particular embodiment, failure casting can be used to cast a failure type that would typically require fine-grained investigation and correction, into a failure type that can be cured by rebooting the system. In these embodiments failure casting can be incorporated into the first step, wherein the failure is treated as one that can be cured by rebooting. Of course, the mere rebooting of the system does not cure the failure, but rather it is the expected recovery procedure that will be run during the subsequent (re)startup that should cure the failure. In other words, the reboot is a cure for the failure only if done in anticipation of a post-reboot recovery process that will handle the observed failure. Thus, there is a tight connection between the failure hierarchy and the recovery procedures that are already in place. With this connection in mind, the system administrator can say "I will treat this failure type B as one of type A, because I expect A's recovery procedure to make B go away".

In a traditional system there is a mapping between symptoms and recovery procedures (sometimes the mapping is explicit, and other times implicit). When using failure casting, this mapping is made simpler, because the recovery procedures are primarily designed to "reboot something" (which in turn can be a component, a node, or an entire system, etc.). Since there is only one mechanism, this technique allows the recovery "logic" to be much simplified; and also enables a different approach to recovery code development. For example, consider the example of a computer system that uses a functional striped-RAID array of disks (RAID-0); if one of the disks fails, the computer cannot continue operating. However, if the computer's startup script checks each disk upon startup and automatically assembles a RAID-0 array using all available non-faulty disks, then rebooting the computer should always bring it up in a configuration that has a RAID-0 available (albeit with potentially fewer disks in the array than had existed prior to the reboot). In this type of embodiment, the failure-casting version of the startup script does not assume it is starting fresh, but rather assumes it is assembling a system from the currently available disks. This allows the script to correctly handle the regular startup scenario, in addition to handling scenarios that include multiple disk-failures.

As described above, the possible failure types (both known and unknown) can be represented in a failure hierarchy. In accordance with some embodiments the failure hierarchy can have many possible parents and children. In accordance with those embodiments wherein the recovery code is designed to act on reboot and restart, then the failure hierarchy defines the ultimate parents as being one of only two types: (a) reboot-curable (restart-curable) failures, and (b) non-reboot-curable (non-restart curable) failures.

Failures that fall into the first category of being reboot-curable are those failures that can probably be resolved by simply rebooting or restarting a system, component, or a subset of the system component. These system components may include, for example, database processes, disk drives, or system nodes in a cluster. When a failure type is reboot-curable, then the system can have some prior knowledge that these failure types can be addressed in this manner. In some embodiments, unknown failure types can also be explicitly or implicitly grouped into the reboot curable category.

Failures that fall into the category of being non-reboot-curable (i.e. failure types that are not reboot curable) are those failures that require some other or additional form of intervention, and can probably not be resolved by simply rebooting or restarting. For example, the additional form of intervention may be the need for a system administrator to fix some portion of the system hardware, or to otherwise intervene to fix the problem, or simply marking the computer as failed, etc. When a failure type is non-reboot-curable, then the system can again have some prior knowledge that these failure types can be addressed in this manner. In some embodiments, unknown failure types can also be explicitly or implicitly grouped into the non-reboot-curable category.

By applying the techniques described herein, failure casting enables systems to coerce the universe of failures into essentially a single type of failure, that of the reboot-curable type, which can be addressed easily by restarting or rebooting the system, or a component of the system. Systems can also be designed so that what would normally be regarded as non-reboot-curable failures (e.g., a disk failure) can be treated as reboot-curable. In accordance with some embodiments, the system can then include additional automated procedures that invoke various forms of restarting to perform recovery on the failed components.

As also described herein, with any system or software, no matter how well designed, some failure types will be unknown throughout the development and deployment process, and may only appear much later during daily use. Since the failure hierarchy can include many subtrees or branches beneath the parent nodes, these subtrees can comprise many failures, some of which have not been anticipated; yet each of the failures in the subtree manifest in the same way to the outside world (i.e., their symptoms are similar). One example of this might be users not being able to connect to a database—the symptoms of being unable to connect to the database can have many underlying causes. The grouping of failures allows the system to cast a failure "up the tree" into the root of that subtree, and say "this is a failure that exhibits symptom X, so I will treat the failure in the manner I treat all such failures, namely by rebooting". It may not be known exactly which of the possible failures in the subtree has occurred; since from the system's perspective only the overriding symptom is observed. Traditionally, one would have to perform diagnosis at this point, (i.e., work down the subtree and try to identify which failure exactly has occurred, so that the proper recovery procedure is then put in place). Instead, in accordance with an embodiment, the failure casting approach connects recovery procedures to symptoms (e.g., "the disk is unavailable"), rather than to actual details within the system (e.g., "the disk controller channel has failed", or "the disk unit is burnt out", or some other reason why that disk might be unavailable).

As further described in the sections that follow, failure casting can also be applied to specific failure scenarios, for example hardware component failures, or failures within clusters of databases. Failure casting provides significant advantages over traditional methods, including simplifying the recovery management process, and improving the chances that the recovery will be correct. Simplifying the universe of possible recovery procedures restricts the different failure choices, which allows the system administrator to selectively focus on the more important failures. The net result of using a failure casting approach is better system reliability and higher system availability. In complex systems, software application fault models can be simplified, encouraging simpler recovery routines which have better chances of providing the correct outcome. In particular, when the remedy is reduced to that of either (a) rebooting or (b) not rebooting the system, the ability to fix failures quickly in complex system is reduced to one of restarting the machine or the system component.

The use of failure casting provides even greater benefits in high-availability systems, which may have many thousands of processor nodes, and for which the failure of a single node is acceptable if that failure is quickly handled and compensated for. In these systems, because reboot-curable failure casting can be used to cast what might be an otherwise-unknown failure into a node-level reboot, which is a failure mode well-understood by the other nodes in the system. This allows a single node among the thousands of nodes to be quickly fixed by rebooting that failed node, without affecting all of the other nodes in the system.

Failure Casting Applied to Computer Systems

FIG. 1 shows an embodiment of a computer system that uses failure casting in accordance with an embodiment of the invention. As shown in FIG. 1, the computer system 100 includes a system manager 102 and a failure casting logic 108. The failure casting logic can also include a failure casting data 104, and a failure casting hierarchy 106. The failure casting hierarchy is used to cast failures of one type into failures of a parent type (with respect to the hierarchy). The failure casting data can in some embodiments specify additional information and options that can be used during the casting process. Applications 118, 120, 122, which can be system components, software applications, or in some instances other entire computer systems or nodes, exhibit a series of failures of different types. For example, as shown in FIG. 1, the failures indicated as failure type A 124, failure type B 126, and failure type C 128, represent some of the different failures which may or may not occur within the computer system at different points in time. In accordance with an embodiment, as the applications or system components exhibit failures the failure casting logic uses the failure casting hierarchy (or simply, the failure hierarchy) to cast each of the failures into a different failure type X 130. The system manager then determines, based on this new type of failure, what the appropriate system action 140 should be.

As further described below, in some embodiments the failure casting system can be used to cast failures of one type into failures of another type, or more generally to cast a plurality of failure types into a plurality of other failure types. In a particular embodiment the failure casting is performed to cast failures into one of only two types: those failures that are reboot-curable, and those failures that are non-reboot-curable. When the plurality of failure types are reduced to the concept of reboot-curable or non-reboot-curable, then the system action is likewise reduced to one of either rebooting or not rebooting the computer system, (although in the latter case can also include additional or alternative actions, including actions that might normally have been taken by a system administrator in the absence of any failure casting solution).

Figure 2:
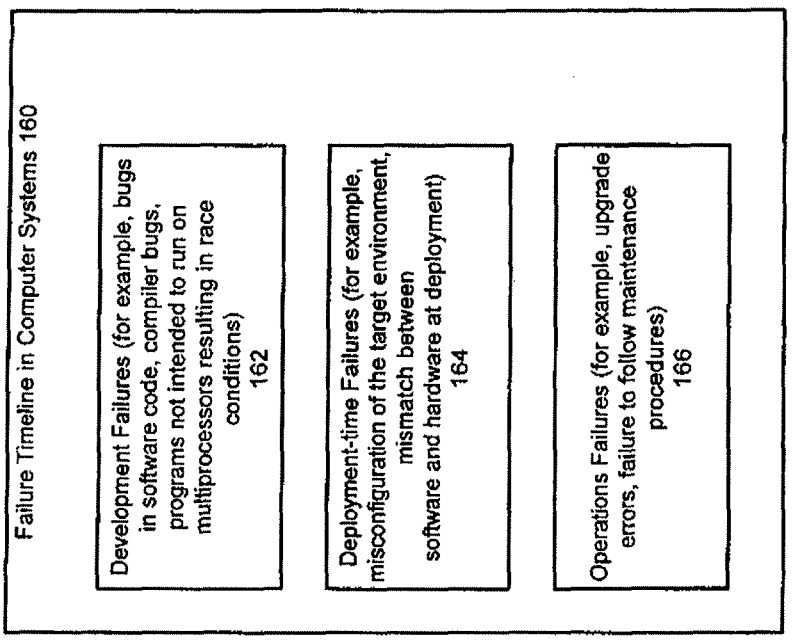
FIG. 2 illustrates the timeline at which different failures may occur in computer systems in accordance with an embodiment of the invention.

Failure casting can be used to address failures that occur at different times and at different locations in the computer system or process, and can also address failures that range from accidental to deliberate, permanent or transient, previously known and understood or completely novel in origination. FIG. 2 illustrates the typical timeline for failures that may occur in computer systems 160. For example, development failures may occur when bugs are introduced into the original software code 162. Similarly, failures may occur during deployment-time, for example when deploying a software application to the targeted environment, or when a mismatch occurs between the software and the hardware on the deployed system 164. Operational failures 166 can occur whenever the system administrator fails to upgrade the machine properly or follow an appropriate maintenance procedure. Even if the testing of all paths through a program was possible, the testing of all theoretically possible execution environments and their ensuing interactions would not. Although many potential failures exist in the software application from the moment that application was coded, failures can also crop up for the first time long after the program has been developed, deployed, and in operation for many years, due to changes and advances in the operating environment within which the application runs.

Classes of Failures in Computer Systems

Figure 3:
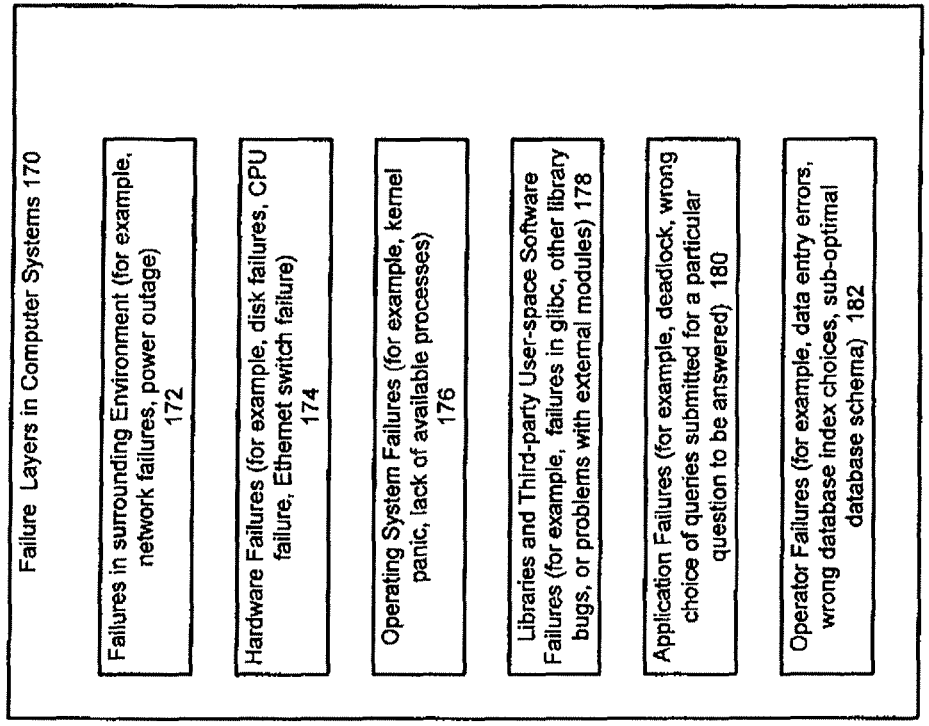
FIG. 3 illustrates the different layers at which failures can occur in computer systems in accordance with an embodiment of the invention.

While failures can occur at different times in the system development process, they can also occur at different locations in the system. FIG. 3 illustrates the different layers at which failures can occur in computer systems 170. For example, failures may occur in the underlying environment (e.g., a network failure or a power outage) 172. Failures may also occur in the system hardware, for example when a computer disk fails, or if the processor fails 174. Operating system failures may include kernel panics, or a lack of available system processes 176. Libraries and third party software are also a common cause of computer failures, including, for example, failures in the library or within external modules 178. Sometimes application failures 180 can cause the entire system to fail, for example if a deadlock occurs in a software application. Operator failures such as data entry errors are another common cause of system failures 182.

Figure 4:
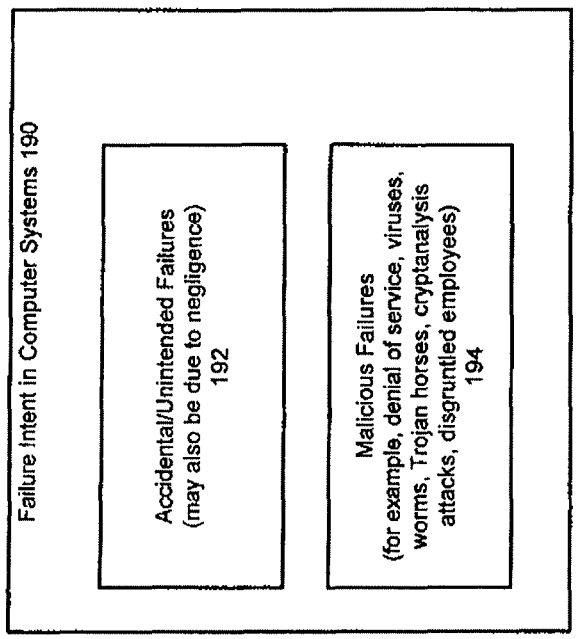
FIG. 4 illustrates the difference between failures that are intentional or unintentional in accordance with an embodiment of the invention.

FIG. 4 illustrates that computer system failures may be due to intentional or unintentional causes. For example, failures that are accidental or unintentional may be due to the negligence of the system administrator or operator 192, or simply an oversight by a software developer. Failures may also be intentional or malicious in nature, for example through the use of a virus, Trojan horse, or other software that is intended to damage the system or cause a component of the system to fail 194.

Figure 5:
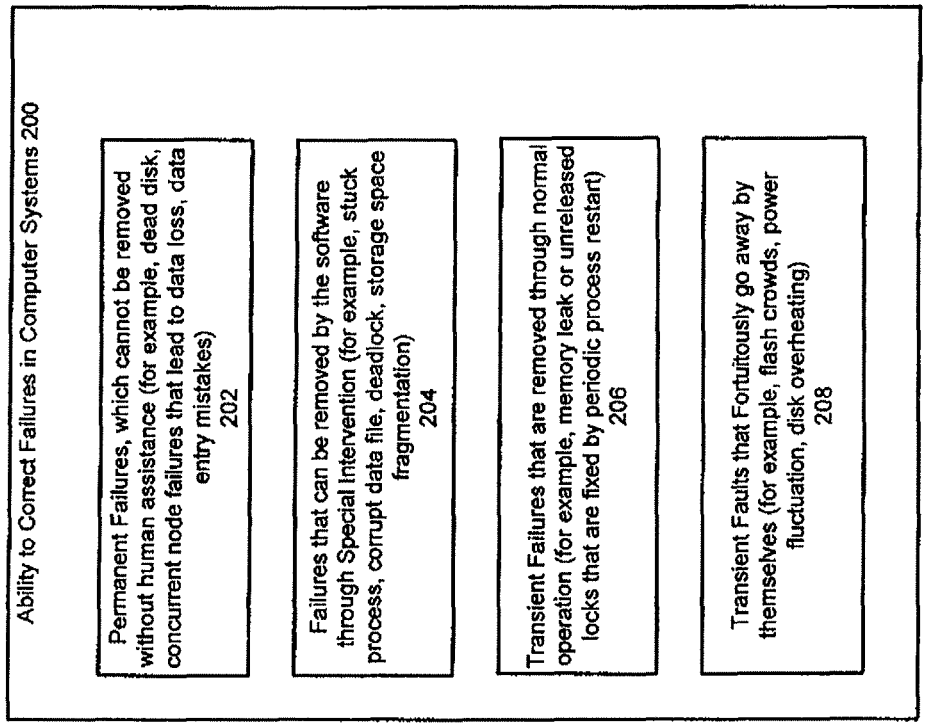
FIG. 5 illustrates the persistency of some failures versus the transient nature of other failures in accordance with an embodiment of the invention.

FIG. 5 illustrates that some failures in computer systems can and should be deliberately addressed by affirmative actions, while some failures disappear of their own accord.

For example, permanent failures 202 which cannot be removed without direct human assistance include failed hardware. Some failures can be removed automatically by the software through special intervention 204, for example by scanning and fixing corrupt data files, or by defragmenting fragmented storage space. Transient failures 206 can be removed by normal operation of the system, for example when leaked memory caused by unreleased process locks is returned to the heap following a process restart. Some transient faults can also disappear by themselves with no intervention by a user or the system, for example the case of a disk overheating and then cooling, or flash crowds of users which eventually dissipate 208.

Failure Casting Approach to Handling Failures

The previous sections generally described how failures of different types can be cast along different axes, for example a failure type B can be cast into a failure type A, or a RAID disk failure can be cast into a reboot-curable failure. The following sections describe how the system performs the actual failure casting.

In accordance with an embodiment, and as shown in FIG. 1, the computer system 100 includes a system manager 102 and a failure casting logic 108, which in turn comprises a failure casting hierarchy 106, and an optional failure casting data 104. The failure casting hierarchy is used to cast "child" failures into failures of a "parent" type. (The terms "child" and "parent" are used here with respect to the hierarchy, in that one failure type in the hierarchy can be related to another failure type in the hierarchy through some form of parent-child relationship; however, in real-life systems, it is possible for the failure types to not have any direct relationship at all). The failure casting data is optional and can in some embodiments specify additional information and options to be used during the casting process. As the applications or system components exhibit failures, the failure casting logic uses the failure casting hierarchy to cast each of the failures into a different failure type. The system manager then determines, based on this new type of failure, what the appropriate system action should be. In accordance with an embodiment the system recognizes potential failures by their symptoms. Their symptoms are then used to determine a place within the hierarchy. Thus, the system can recognize a (child) failure having certain symptoms, but can use the failure hierarchy to determine that the failure should be handled using the method approved for its (parent) failure.

In some embodiments the failure casting system can be used to cast failures of a first type into failures of a second type. In a particular embodiment the failure casting is performed to cast failures into one of two possible types (i.e., one of two possible parents): those that are reboot-curable, and those that are not reboot-curable. Each of the failure categories described above with respect to FIG. 2 through FIG. 5, in addition to hitherto unknown categories, can be addressed to some extent using failure casting.

Figure 6:
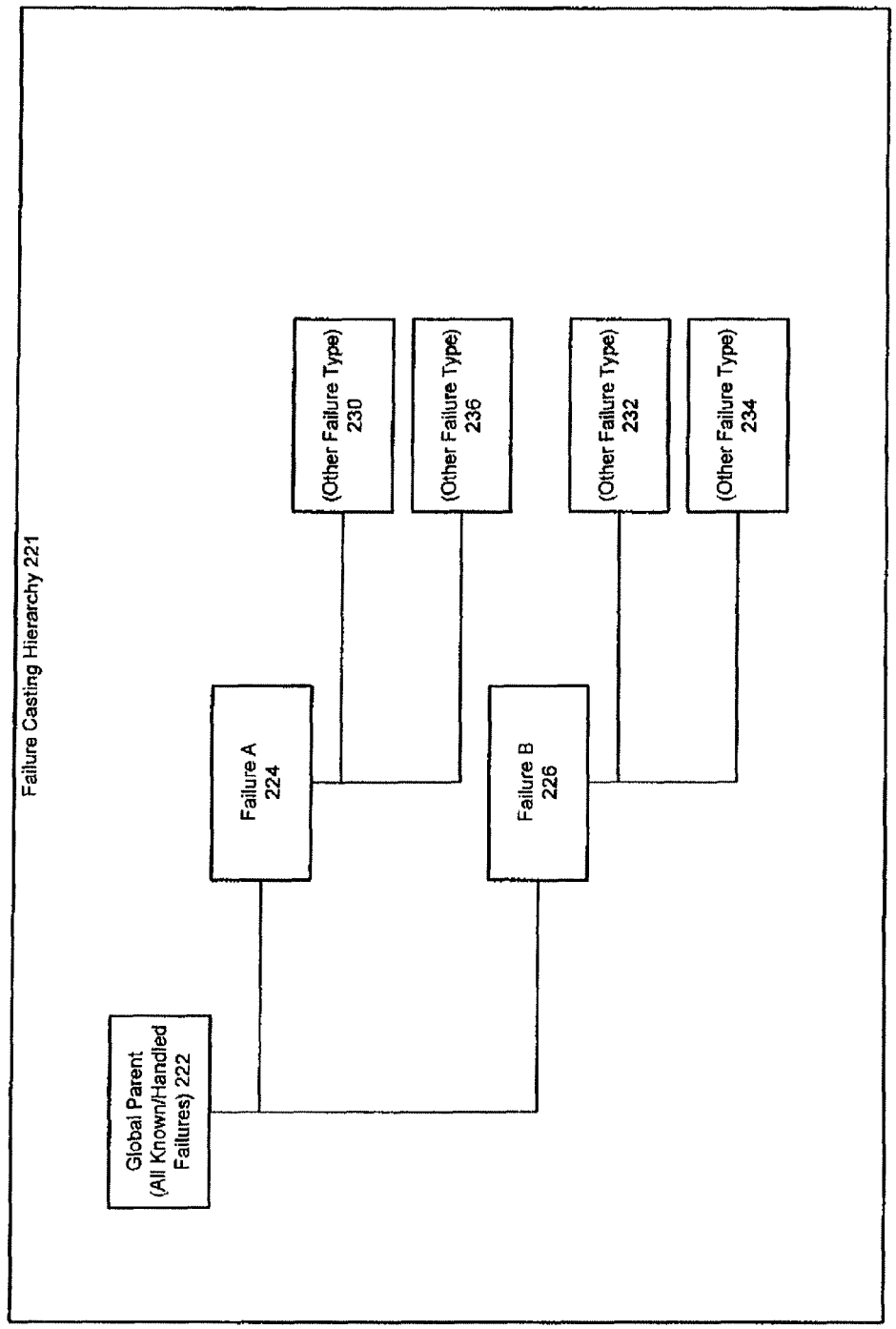
FIG. 6 shows an embodiment of a failure casting hierarchy in accordance with an embodiment of the invention.

FIG. 6 shows an embodiment of a failure casting hierarchy in accordance with an embodiment of the invention. The failures casting hierarchy is used by the system (and in particular, the failure casting logic) to cast "child" failures into failures of a "parent" type. As described above, in this context the terms "child" and "parent" are used with respect to the hierarchy, in that one failure type in the hierarchy can be related to another failure type in the hierarchy, and are not used to reflect the relationship of the underlying failures in the real-life system itself. As shown in FIG. 6, all of the failures that may exist in the computer system, and which have been classified in the failure hierarchy 221, proceed or branch off from a global parent failure 222. Beneath this global parent there can be different failure branches. For example, FIG. 6 shows two failure branches, including failure A 224, and failure B 226. (In a particular embodiment that allows for reboot-curable failure casting, type A can be "reboot-curable" and type B can be "non-reboot-curable"). Each of the branches can themselves have further branches (or sub-branches), which correspond to additional types of failure. For example as shown in FIG. 6, failure A includes further branches 236, 230. Similarly failure B 226 includes sub-branches 232 and 234. The failures within a branch are typically related to one another, perhaps being related to a common system component but having a different severity, although failures within a branch can also be completely different from one another other than the fact that they ultimately share the same parent.

It will be evident that while displayed pictorially in FIG. 6 for ease of understanding, the hierarchy need not be stored or used in such a manner. The hierarchy can actually be implicit, or alternatively can be stored in the system in any number of ways, including for example as a linked list or as a tree structure, as a set of objects, or as a database table, or as some other form of data storage. In particular, as described herein in one embodiment the failure hierarchy can be stored as part of a startup script, initialization file or initialization script, which identifies failures at start up or boot time and allows the failures to be cast to a higher type of failure in the hierarchy during the boot or start-up process. The ability to cast failures at start-up is particularly important in scenarios in which the failure type includes reboot-curable type failures and non-reboot-curable type failures, since the reboot-curable type of failure casting benefits most from performing the failure casting during the actual restart process.

Figure 7:
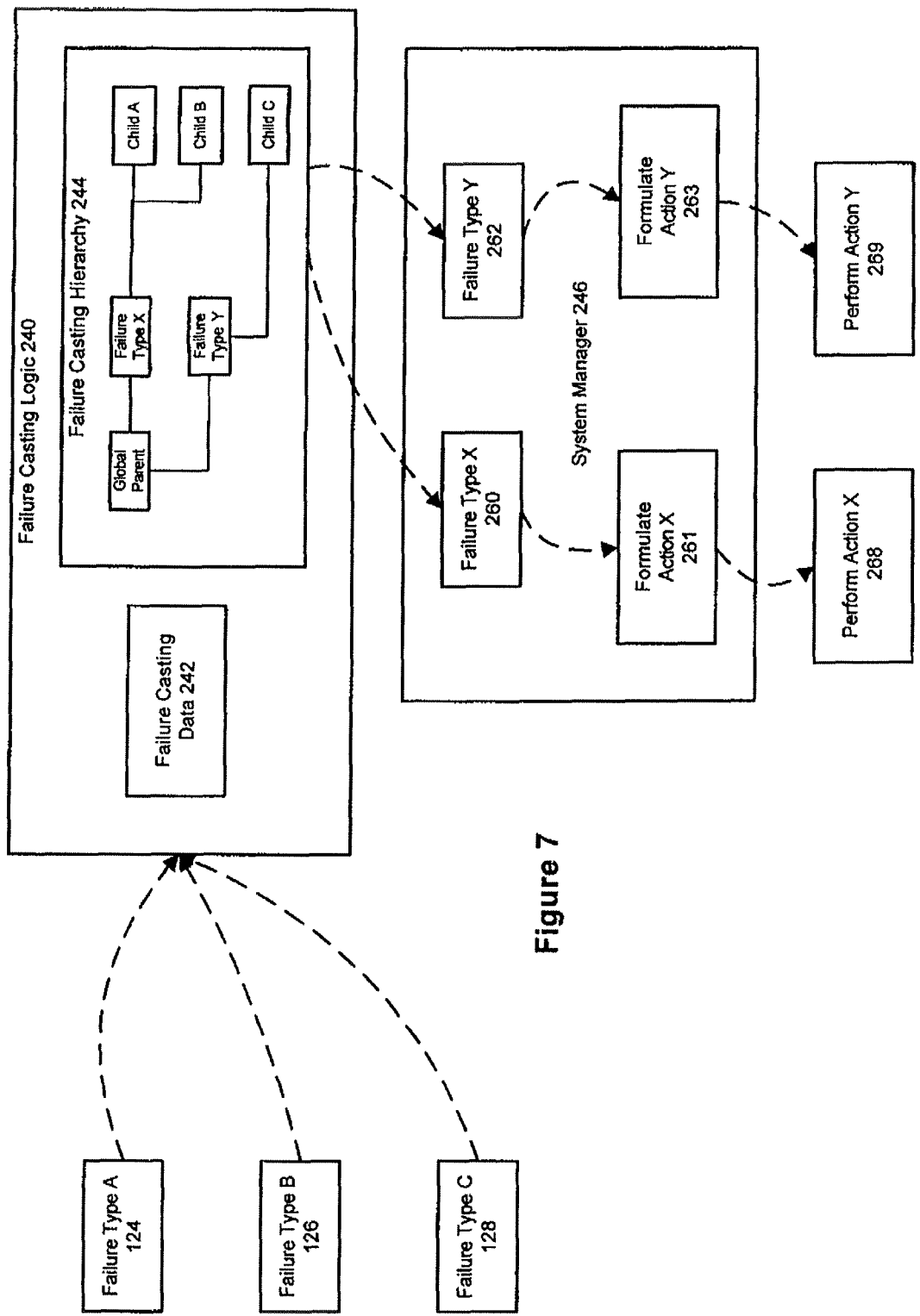
FIG. 7 illustrates an embodiment of a system using a failure casting hierarchy in accordance with an embodiment of the invention.

FIG. 7 illustrates an embodiment of the failure casting process that divides failures into two types of action. As shown in FIG. 7, the system includes a system manager 246 and a failure casting logic 240. As before, the failure casting logic includes a failure casting hierarchy 244 and a failure casting data 242. In accordance with this particular embodiment, as failures are observed by the failure casting logic, including in this example observing failure type A 124, type B 126 and type C 128, the failure casting logic uses the failure casting hierarchy to divide the failures into one of two types: a type X 260 and a type Y 262. In accordance with this embodiment, the system manager knows to handle failures of type X by formulating 261, and performing a first action 268, and also knows that failures of type Y should be handled by formulating 263, and performing a second, different action 269. This allows the system manager to take appropriate action on the system component that has failed.

It will be evident that while FIG. 7 illustrates failures being observed by the failure casting logic, in other embodiments the failure casting logic can be any logic designed to monitor the state of the system and detect when failures occur. This detection can be active and run continuously during operation of the computer system, detecting failures in real-time. The detection can also be somewhat passive, initiated only at startup through the use of a startup or initialization script, and determining failures that are present at that particular moment in time.

General Failure Casting Technique

Figure 8:
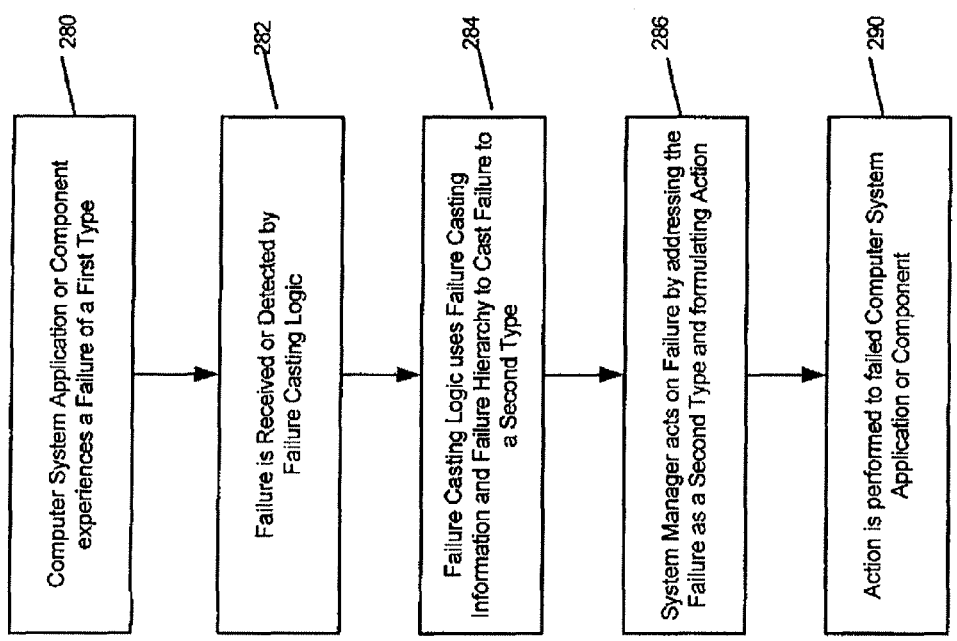
FIG. 8 illustrates a flowchart of the failure casting process in accordance with an embodiment of the invention.

FIG. 8 illustrates a flow chart of a general failure casting method in accordance with an embodiment of the invention. As shown in FIG. 8, in a first step 280, the computer system application or component experiences a failure of a first type. In step 282, the failure is received or detected by the failure casting logic, or by a logical component or feature of the system which has been designed or coded to detect and cast failures. In accordance with some embodiments, the failure is received or detected at start-up using a bootup or initialization script. In accordance with other embodiments, the failures can be detected during run time by an appropriate detection logic that recognizes any change in the system state when a failure occurs. Whether detected at startup or during operation the failures once detected can be handled in the same manner. In step 284, the failure casting logic uses the failure hierarchy to cast the failures into a second or another type of failure. In step 286, the system manager, or a logical component or feature of the system which has been designed to manage the system then acts on the failure by addressing the failure as if it was a failure of the second type, and formulating an appropriate action. Although the system can be designed to map any size set of possible failure types to any size set of other failure types, in most instances the goal is to map a larger set of possible failure types to a smaller set of failure types that the system knows how to handle. Since the system is only required to maintain and understand recovery procedures for a small set of failure types, this allows the system to operate more efficiently in the case of a failure. In step 290, the action is performed by the system manager on the failed computer system or component.

Reboot-Curable Failure Casting Approach

Figure 9:
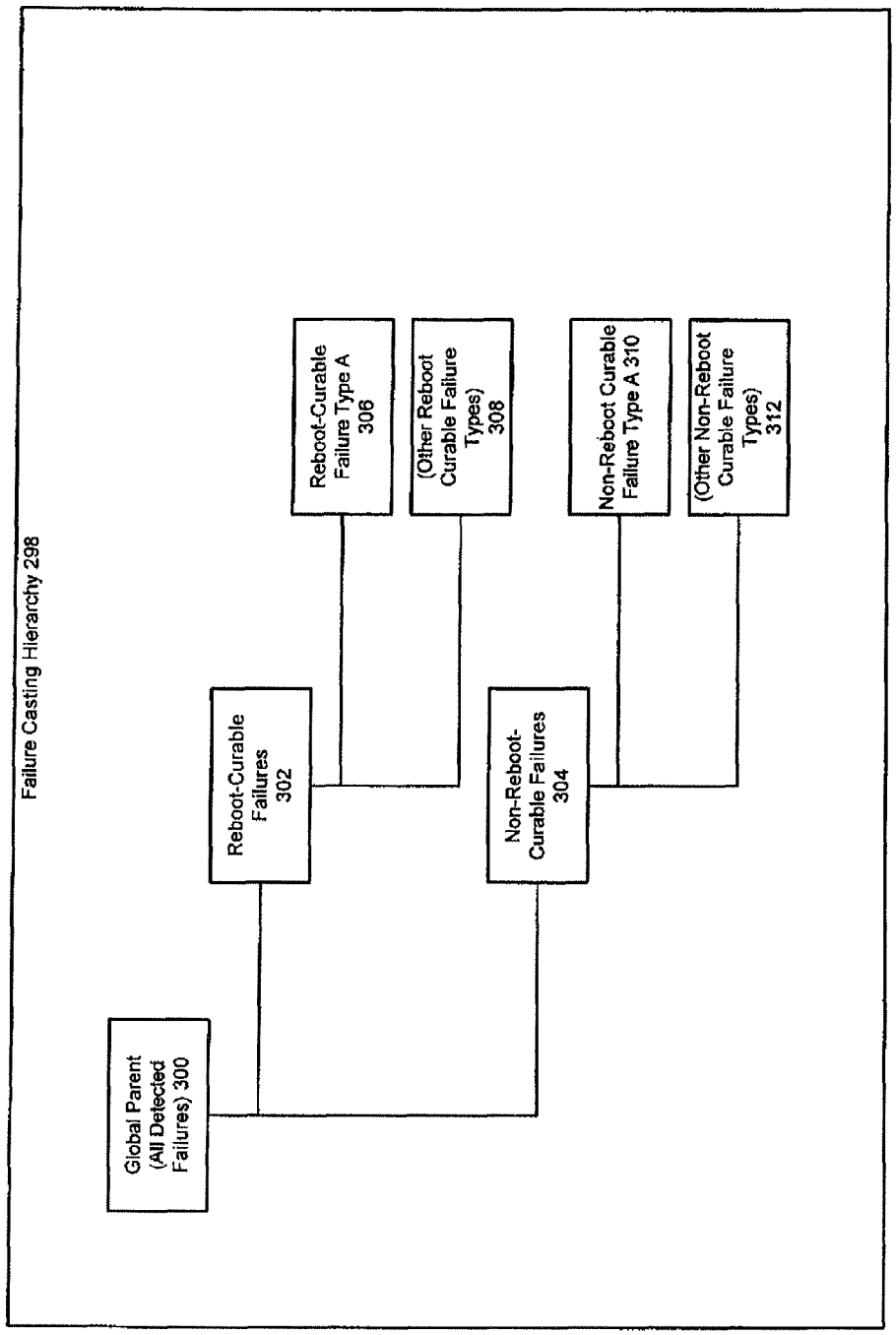
FIG. 9 shows an embodiment of a failure casting hierarchy that includes reboot-curable and non-reboot-curable branches in accordance with an embodiment of the invention.

As described above, failure casting can be used to cast failures of one type into failures of another type. In a particular embodiment the failure casting is performed to cast failures into one of only two types: those failures that are reboot-curable, and those failures that are non-reboot-curable. When the plurality of failure types are reduced to the concept of reboot-curable or non-reboot-curable, then the system action is likewise reduced to one of either rebooting or not rebooting the computer system. FIG. 9 shows an embodiment of a failure casting hierarchy 298 that includes reboot-curable and non-reboot-curable branches in accordance with an embodiment of the invention. As shown in FIG. 9, the hierarchy includes a parent of all failures recognized by the system 300. The difference between the hierarchy shown in FIG. 9 and the generic hierarchy described earlier is that this hierarchy comprises only two primary branches, including a reboot-curable branch 302, and a non-reboot-curable branch 304. Beneath the non-reboot curable branch, the system can list failures that it recognizes, but which are considered to be not reboot curable, or non-reboot-curable. Examples of these types of failures include power supply failures, and corrupt boot sectors, and any other type of failure that would prevent a computer or a node from successfully restarting even if that computer or node was rebooted. Reboot-curable failures are listed beneath the reboot curable branch. Specific examples of reboot curable failures include when the system has run out of processes, or a program has run out of memory, or has corrupt in-memory data structures, or when a single disk has failed in a striped-RAID array 306 or any other failure that the computer system recognizes as reboot-curable. Reboot-curable failures are those failures for which rebooting the system (and in some instances performing an additional action, such as removing the disk drive from a list of healthy drives) should cure the failure.

As described above, although the failure casting hierarchy is shown herein as an actual hierarchy, the hierarchy itself can be stored in any form data storage. As further described above, the failure casting hierarchy can be included within a start-up script, boot script, or initialization script, so that the recovery of the failure is performed at start-up (of the node, process, or thread, etc.), which in turn allows the failure to be cast into a reboot-curable failure. In these embodiments, whenever the system is caused to reboot, the script is run, and the particular arrangement of failure type settings within the script allows failure casting to take place at that point in time. When the system comes back up again, and barring any other combination of errors, then any reboot-curable failures that provoked the need to reboot in the first place, should now be fixed.

Figure 10:
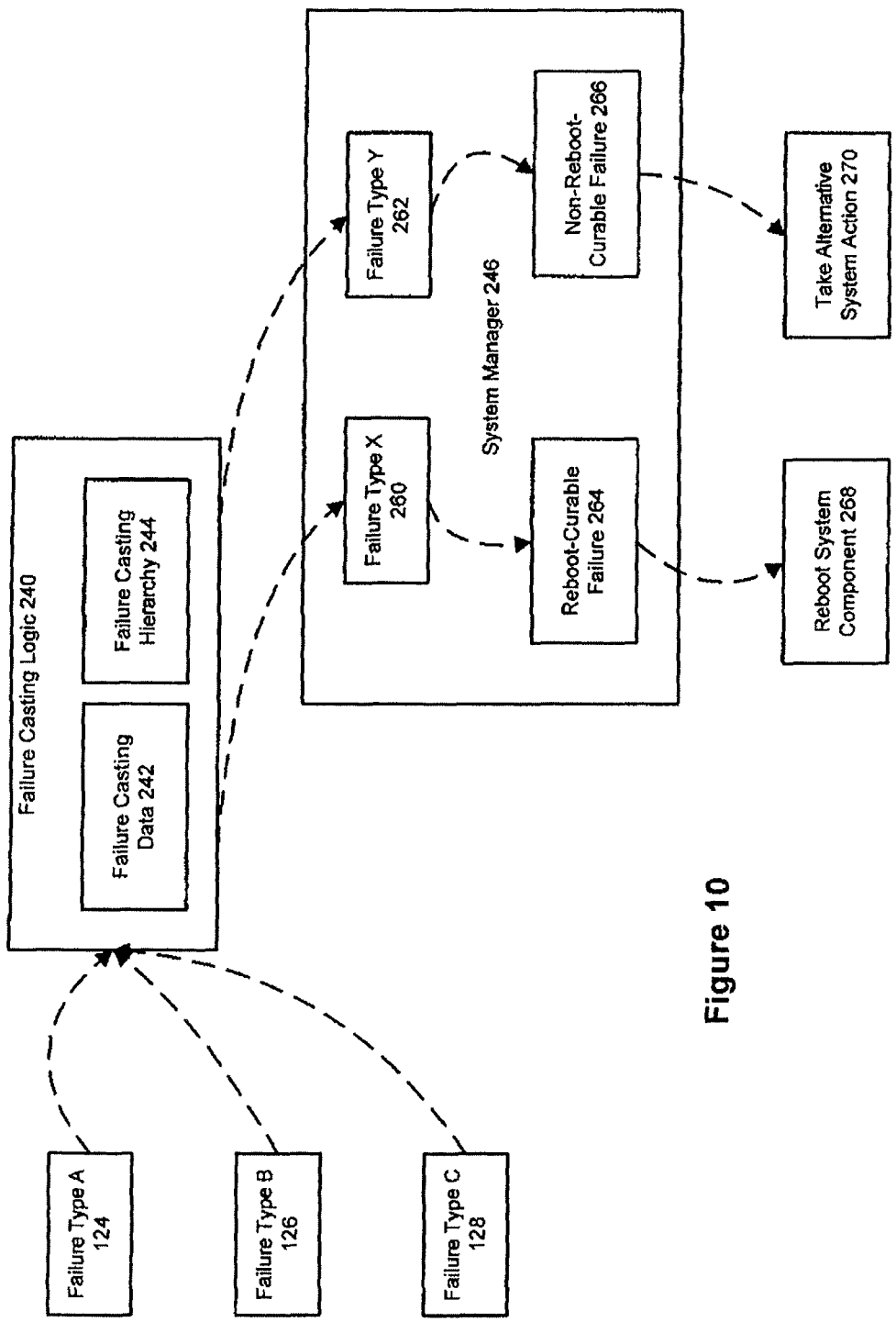
FIG. 10 illustrates an embodiment of a system using a failure casting hierarchy and reboot-curable actions in accordance with an embodiment of the invention.

FIG. 10 illustrates an embodiment of the failure casting process that divides failures into reboot curable and non-reboot curable failures, in accordance with an embodiment of the invention. As shown in FIG. 10, the system includes a system manager 246 and a failure casting logic 240. Again, the system manager and failure casting logic can be logical components or features of the system which have been designed or coded to perform those tasks. Similarly to the embodiment described above, the failure casting logic includes a failure casting hierarchy 244 and an optional failure casting data 242. As failures are observed or detected by the failure casting logic, including failure type A, type B and type C, the failure casting logic uses the failure casting hierarchy to divide the failures into one of two types: a type X 260 and a type Y 262. In accordance with this particular embodiment, the system manager further knows that failures of type X are reboot curable failures 264, while failures of type Y are non-reboot-curable failures 266. This allows the system manager to take appropriate action on the system component that has failed. For example in FIG. 7, the system manager can address the reboot curable failure by rebooting the system component 268. For those failures that are not reboot-curable, the system manager can take an alternative system action 270. The alternative system action in some embodiments can include notifying a human operator, rebooting the computer system, or marking the computer system as failed, or some alternate procedure or combination of procedures.

As similarly discussed above with respect to FIG. 7, it will be evident that while FIG. 10 also illustrates failures being observed by the failure casting logic, in other embodiments the failure casting logic can be any logic designed to monitor the state of the system and detect when failures occur. The failure casting logic or detection logic can be active and run continuously during operation of the computer system, or it can be initiated only at startup through the use of a startup or initialization script, and determine failures that are present at that particular moment in time. The failure casting logic can also be embedded as additional functionality into the operating system itself, or in the parsing of the initialization script. This latter embodiment is particularly useful when the system is designed to perform failure casting at boot time, checking the health of system components, and acting accordingly, since it allows the system to substantially self-check and self-correct itself each time it is booted. The combination of both health-checking and failure casting at start-up time also allows for "reboot-curing", in that the system can be rebooted, and the administrator can be assured that failures which are understood by the system will be handled in an appropriate way, without need for further investigation or input from the administrator.

Reboot-Curable Failure Casting Technique

Figure 11:
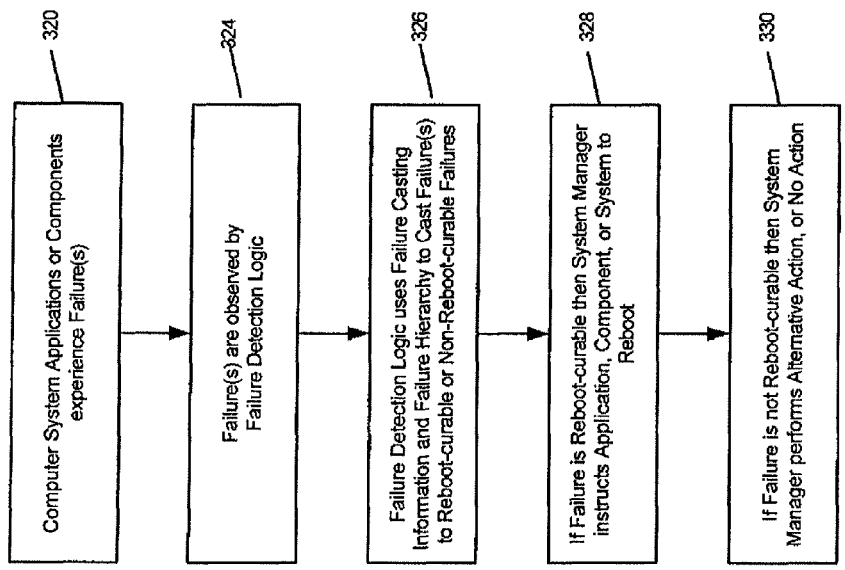
FIG. 11 illustrates a flowchart of the failure casting process including reboot-curable actions in accordance with an embodiment of the invention.

FIG. 11 illustrates a flow chart of a failure casting method in accordance with an embodiment of the invention. As shown in FIG. 11, in step 320, the computer system application or component experiences a failure. In step 324, the failures are observed or detected by the failure detection logic. As similarly described above the failures can actually be detected at start-up through the use of a start-up or initialization script (for example, if a disk has failed, the startup script will not see it as present). In step 326, the failure detection logic uses failure casting to cast the failure into one of reboot curable or non-reboot curable failure type. In step 328 if the failure is considered reboot-curable, then the system manager, or a logical component or feature of the system which has been designed to manage the system, instructs the application component or system component to reboot. If in step 330, the failure is considered non-reboot-curable, then the system manager must determine an alternative action to take. This alternative action can include rebooting the system, marking the component as failed, or another procedure or combination of procedures.

Since in this embodiment, the system is only required to maintain and understand a single type of recovery procedure (i.e. reboot the system) for a particular set of failure types (i.e. reboot curable failures), this allows the system to operate quickly, and without further operator input, when a reboot curable failure occurs.

Failure Logging and Detection

In accordance with one embodiment, failure detection is performed by recording and/or logging events that occur within the system, and by monitoring the progress of those events. In this way the system's behavior can be implicitly monitored. This information is then provided to the system manager, so that the system manager can decide when a failure has occurred and how best to handle it and/or cast it. For example, in accordance with an embodiment, the system uses five basic levels of logging:

INFO—for normal actions, whose presence indicates liveness of a component. This can be considered a heartbeat type of event; components record a message at this level when they are about to commence input/output (I/O), or start up a process, or perform any task that constitutes making forward progress from an application point of view;

WARN—this is considered a suspicious event, or something that might not have been intentional (for example, a conversion exception during string construction);

ERROR—this can be any clear error, but one that allows the program to continue operating (for example, a query was submitted to a database process, but the response was malformed);

FATAL—this type of error indicates that the system or component cannot continue operating for whatever reason; and DEBUG—this type of logging allows the system to provide any additional contextual information about more-or-less exceptional events for offline debugging.

It will be evident that alternate levels of logging can be used, or additional levels of logging, depending on the particular embodiment and needs of the system. In accordance with an embodiment, the system logs information during runtime and at the following points: when starting/stopping a program and/or a child program; before and after all network and disk input/output; before and after any computer-intensive operation; whenever an error occurs (in which case the system can also provide sufficient context to debug the error offline); and whenever an exception is about to be thrown, which is then also logged at the WARN level.

Heartbeats and progress counters can be employed to help with the detection of failures. For example, the system manager can count the number of events logged by each activity (i.e., by each process and/or node) in the system; one that hasn't made progress for a long period of time becomes suspect, and may be deemed failed. In those embodiments that understand reboot-curable failures, this failure can be cast into a reboot-curable failure and result in rebooting the failed component, or the entire system. For example, in accordance with an embodiment, if a node in a cluster does not log any INFO events for a long time, then that node is deemed failed, and is thus subject to reboot. If the node ultimately recovers from the reboot, then the unknown failure in the node was successfully cast into a reboot-curable failure.

Another type of progress counter that can be used is a watchdog timer. A watchdog timer is a process by which the system manager counts the number of events logged by each activity in the system; one that hasn't made progress for a long time similarly becomes suspect and subject to failure-casting. Again, in those embodiments that understand reboot-curable failures, the failure casting and failure handling may include rebooting the process or node responsible for that activity.

Failure Casting Applied to RAID Arrays

The above-described failure casting techniques can also be used to manage failures in a complex computer system, including, for example, a system that includes a RAID or similar array with multiple disk drives and multiple potential points of failure. In some embodiments reboot-curable failure casting can also be used each time the system is initiated, switched on, or is forced to reboot.

The distribution of data across multiple disks using a technique such as Redundant Array of Inexpensive Disks (RAID) can be managed by either a dedicated hardware component, or by software programming. Additionally, hybrid RAID environments exist that are partially software-based and partially hardware-based. A typical hardware implementation of RAID requires a special-purpose RAID controller. The controller links to the host computer, handles the management of the disks, or the drives and performs parity calculations. Hardware implementations also typically support hot swapping, allowing failed drives to be replaced while the system is running. With a software RAID implementation, the operating system manages the disks of the array through the normal system disk-drive controller. With the increase in today's computer processing speeds, software RAID can sometimes operate faster than hardware RAID. Unlike hardware-based implementations, in a software RAID environment there is no additional layer between the disks and the operating system, such as a hardware RAID controller. As such, in a software RAID environment the operating system must talk directly to the disks. RAID can be deployed in varying degrees of redundancy and performance settings, depending on the particular needs of the system. A RAID-0 array (sometimes referred to as a "striped volume") splits data evenly across two or more disks, with no parity information for redundancy. As such, RAID-0 is typically used to increase performance, rather than to improve data safety, and its performance benefits are a primary reason that RAID-0 is commonly used in large enterprise-scale systems. However, since data is shared between disks without redundancy, the loss of one disk results in data loss, and disks cannot be swapped out as they might for example in a RAID-5 setup. This can cause particular problems in software RAID-0 arrays, and in the enterprise systems that use RAID-0, because when a disk fails it can cause the system to freeze or to hang.

In many instances, the system will determine a failure during runtime when a disk-accessing application is running, tries to perform an operation on the disk, and fails. The operating system's event log daemon will additionally recognize the I/O error on that particular disk, and the system manager will be notified. The system manager corroborates these two events and decides that a disk is malfunctioning. The system manager then reboots the entire hardware node. Normally, disks are checked using a combination of BIOS start-up and Power-On Self Test (POST) routines, together with specialized boot-up protocols (such as BOOTP) to obtain a bootloader, which in turn loads and executes a kernel, which then uses its own configuration files to re-establish the RAID array. The problem is, if a disk has failed, the operating system will become stuck attempting to reconstruct the RAID array. In accordance with an embodiment, if failure casting is used, then once the node is back up and running, the failed disk is automatically deconfigured, and the node uses only the remaining disks to construct a RAID-0 array and to (re)populate the array with data.

Figure 12:
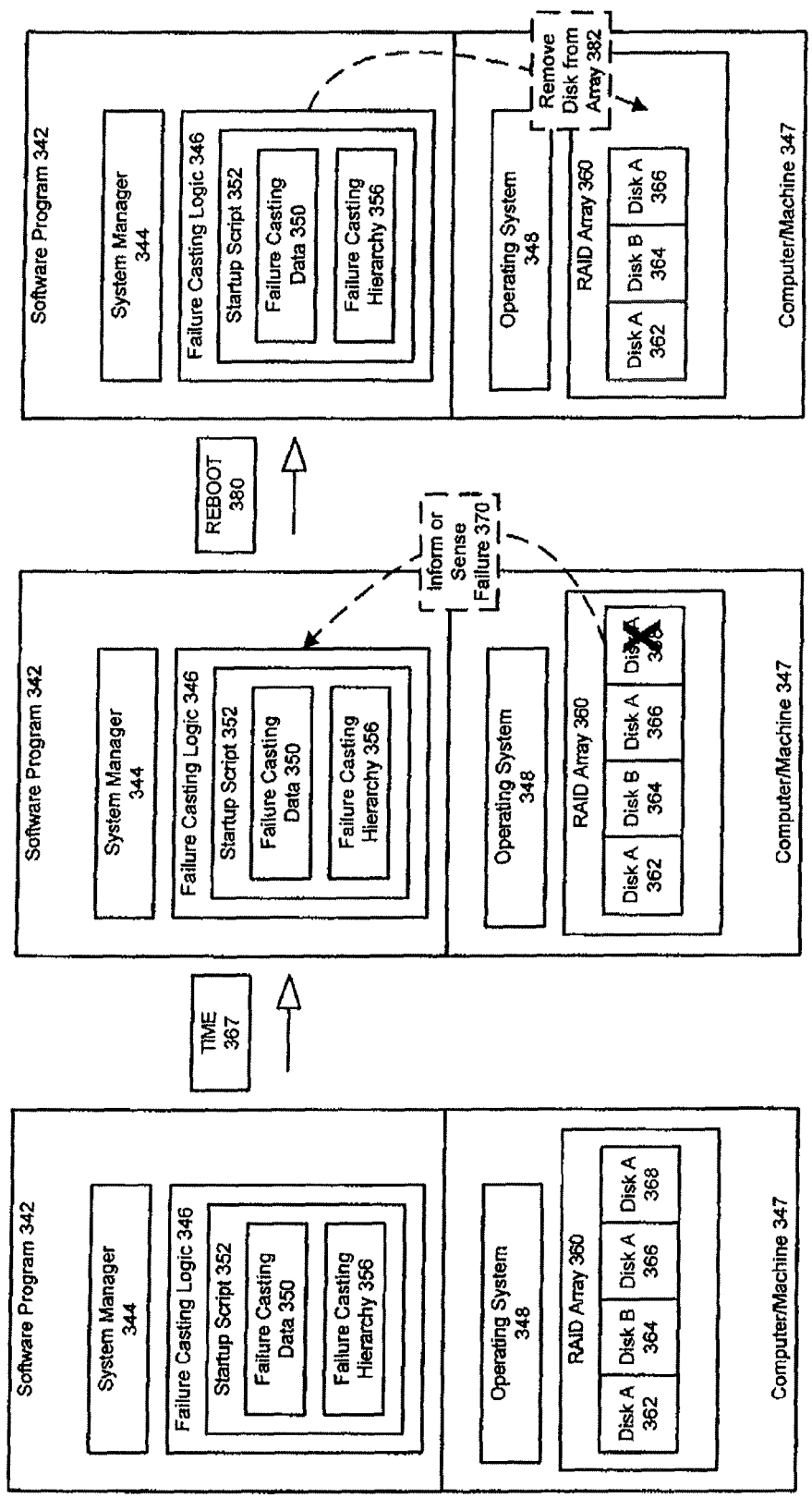
FIG. 12 illustrates an embodiment of the invention that applies failure casting techniques to a RAID array as used in a computer system.

FIG. 12 illustrates a system in accordance with an embodiment that applies failure casting techniques to a software RAID-0 array as may be used in a computer system or an enterprise system. As shown in FIG. 12, the computer system includes a software program 342 that is responsible for managing access to the RAID array 360. The system also includes a system manager 344, a failure casting logic 346, and an operating system 348. The failure casting logic itself includes a failure casting hierarchy 356 and an optional failure casting data 350. In accordance with an embodiment, the failure casting data and the failure casting hierarchy can be included in a start-up or initialization script 352. Together each of these components are used at start-up or during the run-time of the system to determine the health of the RAID array and to cast failures that may occur into reboot curable or non-reboot failures.

As shown by way of example in FIG. 12, the RAID array can include four disks 362, 364, 366, 368. (It will be evident that other numbers and types of disks can be used depending on the particular embodiment or implementation). If after a period of time T 367, one of the disks fails, here indicated by the "X" symbol over the failed drive, then the system informs 370 the failure casting logic of the failure, or alternatively the failure casting logic observes the failure. As described above, the system manager and failure casting logic can be logical components or features of the system which have been designed or coded to perform these tasks. Once the failure has been detected, the system can perform a reboot 380. In those embodiments that embed the failure casting hierarchy in a start-up script, the system can cast the failure into one that is repaired on reboot and the system can then perform normally and repopulate the data on the RAID-0 array (e.g., from a backup node), but excluding 382 the failed disk. In this way, the computer system can have maximum up-time, and failures can be handled quickly and simply by rebooting the computer.

The above technique can be further applied to RAID-based system that use data replication. With replication, the content of a particular set of data can be found on more than one node, and any one of those nodes can be used to answer a query. In accordance with an embodiment, the standard startup or initialization script used in the system can be augmented with a new initialization script that, upon every startup (regardless of whether a failure has occurred or not), performs the following steps:

1. Scan the disk controller for all available disks. (For example, in a SCSI system, the system can scan the SCSI bus for all available disk devices).
2. For each disk, examine its partition table, and verify that the partition table conforms to the one required by the system. (Typically, there will be a set of partitions that belong to one array (e.g., A1), a set of partitions that belong to another array (e.g., A2), and so on).
3. For each partition that is expected to belong to a RAID array, perform a health-check. (For example, on Linux systems, a tool like mdadm can be used to check the health of the disks and a tool like fdisk to check the partitions thereon).
4. Use the healthy partitions to construct arrays A1, A2, etc. (If the healthy partitions do not include all original partitions, then the newly-constructed arrays will have inconsistent data).
5. Perform a filesystem check on each newly-constructed array. Whichever array fails this check is most likely a partially-reconstructed array (i.e., one or more partitions are missing).
6. For each array whose filesystem check succeeds, verify that the expected datafiles (i.e., the database files) are correct. In accordance with an embodiment this includes the substeps of:
   6.1. Compute a checksum across each datafile.
   6.2. Send the checksum to a checksum directory server and verify its correctness.
   6.3. For any datafiles that fail the checksum test, delete them and copy over a fresh version from one of the replicas.
7. For each array whose filesystem check fails, reformat that entire array, and then copy over fresh versions of the required database files from their replicas.

When the above script is integrated into a system, it allows the system to cure hard drive failures at boot time by restarting the hardware node, since upon startup the bad disk will not contribute healthy partitions because it will either: (a) fail the BIOS check; or (b) the kernel will not list it as present on the disk controller (SCSI bus); or (c) the partition table will not be readable; or (d) the partition health check will fail.

In this manner the initialization script embodies the failure-casting hierarchy within the script itself, and when the script is executed the system performs the role of failure casting logic. Since the disk does not contribute healthy partitions, it is implicitly deconfigured by the script. The node then reconstructs the datafiles it needs by receiving them from other nodes in the cluster, where they have been replicated. Thus, the effect of the restart-based cure is that the node may now run slower (since the RAID-0 array now has one less disks, which reduces its I/O throughput proportionally), but other than that, from the end user's perspective there will be no apparent change in the node's functionality.

There are cases in which the disk may pass all the checks and still be configured into an array, despite it being faulty. Failures can include lack of service, also known as a stopping failure, for example, when the disk does not respond to queries; degraded service, for example, when operations take much longer time than normal to complete; and deceptive service, also known as Byzantine failure, in which a read request returns a wrong answer. The initialization script described above only handles the lack of service failure type. To add support for the latter two, whenever such failure mode is noticed by the application (through the use of timing mechanisms, or checksums, or because it is experiencing the same kind of problems over and over again from the same disk), the failure detection logic or the system itself can instruct the operating system to mark that particular disk as faulty. As a result, on the next reboot, the disk will no longer be part of the standard configuration. In this instance the script handles degraded service and deceptive service just as it would handle a stopping failure. Various other disk failures can be cast into reboot-curable failures by simply introducing an additional step in the startup script of a cluster node.

Failure Casting Applied to Clusters

The above-described techniques can also be used to manage failures within clusters of computers. As before, the above sequence of steps can be applied during start-up to use failure casting each time the system, or a node in the system, is initiated or switched on.

Cluster failovers are particularly important since they often exhibit Byzantine failures. Unlike "stopping failures", where the system stops responding, a Byzantine failure is one in which the system provides the wrong response to a query. Byzantine failures are particularly pernicious, because they are hard to detect, and thus propagate through a computer system for a long time.

For example, if the output of one function is used as the input to another, then small round-off errors in the first function can produce much larger errors in the second. If the output of the second function is then used as input into a third, the problem can grow larger, until the output values are essentially worthless.

Byzantine failure-tolerant algorithms must cope with such failures and still satisfy the specifications of the problems they are designed to solve. However, Byzantine failures are particularly difficult to handle. In accordance with an embodiment, failure casting can be used to cast Byzantine failures into stopping failures, which can then be addressed appropriately. Byzantine failures often occur after an initial period of something appearing "suspect", for example the node slowing down because it runs out of memory. If nothing is done to address the suspicious behavior, then after a period of time the node may start inadvertently corrupting its data structures. However, if in accordance with an embodiment, the system acts promptly with a reboot, it may prevent (which is better than recovering from) a Byzantine failure.

It will be evident that using failure casting to tackle Byzantine failures essentially makes the components in the system "fail-fast", i.e., ones that are designed to immediately report any growing failure or condition that is likely to lead to a stopping failure. Distributed algorithms that run in clusters can be greatly simplified when stopping failures and failure casting is used. This approach is markedly different, for example, from the Nagaraja approach described earlier, which chooses to enforce an expected fault model by crashing hardware nodes whenever something goes wrong. However, in accordance with the present embodiment, the recovery process is designed so that this type of "fault model enforcement" becomes possible.

Figure 13:
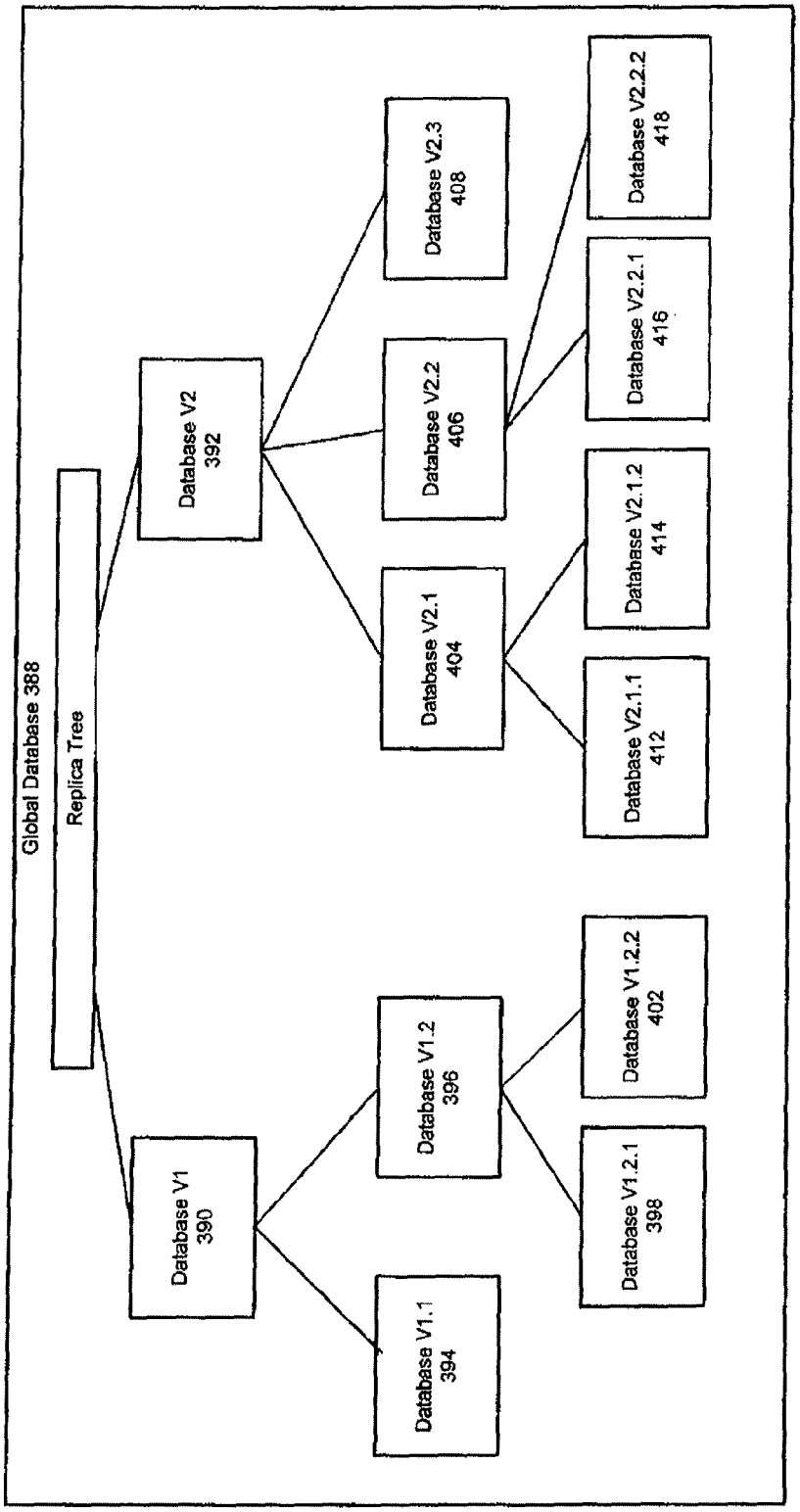
FIG. 13 illustrates an embodiment of the invention that applies failure casting techniques to a cluster.

FIG. 13 illustrates an embodiment of the invention that applies failure casting techniques to a distributed database running on a cluster. In accordance with an embodiment, a global database can be structured as a collection of segments or "child databases" running on a plurality of cluster nodes. The entire set of data is partitioned into smaller data segments, and each child database manages one such segment. Such a setup can be used for extremely large data storage systems, of the order of many Terabytes. Large capacity data storage systems are commonly used in enterprise systems, and particularly in engineering, telecommunications, scientific, statistical, ecommerce, and other systems. As shown in FIG. 13, the entire global database 388 can be distributed across a set of nodes 390-418, arranged into child databases 390, 392, which can in turn have their own child databases (394, 396) and (404, 406, 408) respectively, and so on. When viewed together the child databases of a particular parent collectively contain the same data as their parent, i.e. the resulting segments represent a (recursive) partition of the original data segment. A query across the entire database is transformed into queries across the various segments or various child databases. Through replication, the content of a particular segment of the database can be found on more than one node, and any one of those nodes can be used to answer a query over that particular segment. The system also maintains a replica tree which is used to is used to decide how to distribute the query across the various cluster nodes. When a particular node fails, it is removed from the replica tree, so that. subsequent queries will not see any of the failed nodes.

FIG. 14 illustrates a flowchart of a method for applying failure casting techniques to a cluster. As shown in FIG. 14, As shown in FIG. 14, in step 420, the system receives a query request, or begins a transaction, that is to be applied to the global database. In step 422, the system uses the replica tree to determine a list of database nodes that provide a complete view of the global database. In step 424, the system then prepares to apply the query over the list of database nodes. In step 426, the system determines whether all nodes are available. If there are no failures in the nodes (step 428), then in step 430 the system applies the query to the database nodes and return a result. If, however in step 426, the system determines that any of the nodes are unavailable (step 432), then in step 434 the system removes the failed node from the list, and determines a new set of nodes from the replica tree (i.e., it asks the system manager for a new set of nodes with data segments. In the example of processing a transaction, then for every node that is in the new set, but was not in the old set, i.e., for every node that has replaced a failed node the system (a) opens connections to the node, (b) issues a begin_transaction (with a transaction identifier, Tid), (c) runs the query on that node, and (d) issues end_transaction (with the transaction identifier Tid) on that node.

While the query is being answered, in step 436, the system initiates failure casting. In step 438, the system reboots the Failed Node, treating any failures in the node using failure casting. In step 440, if the failed node comes back up, then it can eventually be cycled back into the system and the replication tree. If not, the node is eventually marked as dead.

Failures can keep occurring, but as long as the segment sets provided by the system manager are correct, then the master will eventually receive a complete reply to the database query. End users have no knowledge that failures may have occurred underneath. This design allows the system to cast a large class of failures into node-level crashes/reboots, and still successfully respond to a request for data from the database.

Failure Casting Applied Recursively

A difficult problem in managing failures is actually specifying a policy for automatic handling of recovery (for example, what to do, when to do it, and in reaction to what situation to do it). Using extensive implementation of failure casting, a very simple failure management policy can be provided: when something seems suspect, or operating strangely for a certain amount of time, then restart it. If that doesn't work, then restart a larger subsystem that contains the initial one. As described above, subtrees of the failure casting hierarchy can consist of many failures, some of which are not even anticipated; yet, all these failures manifest in the same way to the outside world (i.e., their symptoms are similar, such as users not being able to connect to the database). This grouping of failures allows the system to cast "up the tree" into the root of that subtree, and say "this is a failure that exhibits symptom X, so I will treat it the way I treat all such failures, namely by rebooting within the perimeter in which that failure manifested". Thus, recursive casting is the process of repeatedly performing failure casting as one moves up through the failure hierarchy, in response to the fact that the previous failure cast and associated treatment did not cure the observed problem.

For example, in a RAID-0 embodiment, the system may be observing input/output errors on a disk, so it can cast this set of symptoms to a "disk is unavailable" set of symptoms. If the reconstruction of the RAID-0 is not successful, because none of the disks are available (which may be the case if the controller has failed), then the system can cast higher up to the "no disk available" set of symptoms which is equivalated to the "node is not available" set of symptoms. This now takes the system into a node-level shutdown recovery scheme, where the rest of the cluster is able to continue functioning even in the absence of this node. In other embodiments it may be desirable to cast from "a disk is unavailable" to "SCSI bus is not available" or to "controller malfunction", in which case it is still casting up the failure hierarchy (because the failure hierarchy is defined by how we recover given a set of symptoms), but it is not expanding the boundaries of the failure. The important thing to note about recursive casting is that, when a set of symptoms are cast to a failure type, it may initially be wrong, and the actual failure is underneath a different node in the failure hierarchy (i.e., in a different subtree). As the system progressively casts to nodes higher up in the tree, it accounts for increasingly more subtrees, and encompasses increasingly more possible failures. The net effect is that larger numbers of failures, of all different levels within the system, can be captured within the set of reboot-curable failures, and with successive rebooting it is possible to heal the system, without having to discern which failure was the underlying cause of the symptoms.

The present invention can be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVDs, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, while failure casting has been described above with regard to the particular example of casting failures into reboot-curable, or non-reboot-curable failures, it will be evident that failure casting can generally be applied to casting any type of failure into any other type of failure. For example, failure casting can be used to cast certain types of failures into reboot-curable failures, and to ignore all other failure types. Failure casting can also be used to cast a group of many failure types into a single failure type. Additional embodiments and implementations will be evident to one skilled in the art. It will also be evident that, while the embodiments of the systems and methods described above are described in the context of disk arrays and clusters it will be evident that the system and methods can be used with any type of computer system components, hardware, or software. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method of managing failures in a computing system, wherein the method is implemented at least partly by a device, and wherein the method comprises:
   detecting a failure of a first failure type in the computing system;
   casting the first failure type to a second failure type, different that the first failure type, wherein the second failure type has an associated failure recovery; and
   attempting to resolve the first failure type by using the failure recovery associated with the second failure type.

2. The method of 1, wherein the attempting to resolve the first failure type by using the failure recovery associated with the second failure type occurs at boot and/or start-up time.

3. The method of 1, wherein the computing system includes an array of devices and the first and second failure types are associated with failures of the array of devices.

4. The method of 1, wherein the method further comprises: using a failure casting hierarchy in a script that includes a set of non-reboot curable failures that are checked at boot time, and if a device exhibits a failure upon bootup within the set of non-reboot-curable failures, then the disk is not added to the array of devices.

5. A device that includes one or more processors configured to manage failures in a computing system at least by:
   detecting a failure of a first failure type in the computing system;
   casting the first failure type to a second failure type, different that the first failure type, wherein the second failure type has an associated failure recovery; and
   attempting to resolve the first failure type by using the failure recovery associated with the second failure type.

6. The device of claim 5, wherein the attempting to resolve the first failure type by using the failure recovery associated with the second failure type occurs at boot and/or start-up time.

7. The device of claim 5, wherein the computing system includes an array of devices and the first and second failure types are associated with failures of the array of devices.

8. The device of claim 5, wherein the one or more processors are further configured to: use a failure casting hierarchy in a script that includes a set of non-reboot curable failures that are checked at boot time, and if a device exhibits a failure upon bootup within the set of non-reboot-curable failures, then the disk is not added to the array of devices.

9. A non-transitory computer readable storage medium storing at least executable code for managing failures in a computing system, wherein the executable code when executed at least:
  detects a failure of a first failure type in the computing system;
  casts the first failure type to a second failure type, different that the first failure type, wherein the second failure type has an associated failure recovery; and
  attempts to resolve the first failure type by using the failure recovery associated with the second failure type.

* * * * *